(12) United States Patent
Komori et al.

(10) Patent No.: US 10,746,171 B2
(45) Date of Patent: Aug. 18, 2020

(54) CONTROL DEVICE FOR ELECTRIC MOTOR AND HYDRAULIC PRESSURE SUPPLY SYSTEM

(71) Applicant: MITSUBISHI ELECTRIC CORPORATION, Tokyo (JP)

(72) Inventors: Masaaki Komori, Tokyo (JP); Satoshi Kawamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 161 days.

(21) Appl. No.: 15/555,432

(22) PCT Filed: May 29, 2015

(86) PCT No.: PCT/JP2015/065620
§ 371 (c)(1),
(2) Date: Sep. 1, 2017

(87) PCT Pub. No.: WO2016/194063
PCT Pub. Date: Dec. 8, 2016

(65) Prior Publication Data
US 2018/0347416 A1    Dec. 6, 2018

(51) Int. Cl.
*F04B 49/08* (2006.01)
*F04B 23/04* (2006.01)
(Continued)

(52) U.S. Cl.
CPC .............. *F04B 49/08* (2013.01); *F04B 17/03* (2013.01); *F04B 17/05* (2013.01); *F04B 23/04* (2013.01);
(Continued)

(58) Field of Classification Search
CPC .. F16H 61/0031; F04B 23/04; F04B 2205/05; F04B 49/08; F04B 17/03; F04B 17/05; F01M 1/16
(Continued)

(56) References Cited

U.S. PATENT DOCUMENTS 6,769,502 B2 *   8/2004   Nakamori .............. B60K 6/365
                                                    180/65.25
7,481,053 B2 *   1/2009   Kitano ..................... B60K 6/48
                                                    60/329
(Continued)

FOREIGN PATENT DOCUMENTS

JP    2008-151016 A    7/2008
JP    2012-140912 A    7/2012
(Continued)

*Primary Examiner* — Christopher S Bobish
(74) *Attorney, Agent, or Firm* — Birch, Stewart, Kolasch & Birch, LLP

(57) ABSTRACT

A hydraulic pressure supply system includes a mechanical oil pump; an electric oil pump; an electric motor that drives the electric oil pump; a control device that controls the operation of the electric oil pump; and a hydraulic pressure measurement circuit that measures a hydraulic pressure of the outlet-side pipe of the electric oil pump. The control device starts supplying electric power to the electric motor to thereby start drive of the electric oil pump before the mechanical oil pump stops operating, and limits the power-supply current to the electric motor to a first current or less during a time period between the start of the drive of the electric oil pump and the time when the hydraulic pressure measured by the hydraulic pressure measurement circuit exceeds a prescribed outlet hydraulic pressure.

5 Claims, 17 Drawing Sheets

(51) Int. Cl.
*F04B 49/06* (2006.01)
*F04B 17/03* (2006.01)
*F04B 49/20* (2006.01)
*F16H 61/00* (2006.01)
*F04B 17/05* (2006.01)

(52) U.S. Cl.
CPC ............ *F04B 49/065* (2013.01); *F04B 49/20* (2013.01); *F16H 61/0031* (2013.01); *F04B 2203/0201* (2013.01); *F04B 2203/0202* (2013.01); *F04B 2205/05* (2013.01)

(58) Field of Classification Search
USPC .............................................................. 417/6
See application file for complete search history.

(56) References Cited

U.S. PATENT DOCUMENTS

| | | | | |
|---|---|---|---|---|
| 7,953,533 | B2* | 5/2011 | Tsuda .................... | B60W 20/40 |
| | | | | 701/51 |
| 8,475,137 | B2* | 7/2013 | Kobayashi .............. | F04C 2/102 |
| | | | | 417/44.11 |
| 8,833,335 | B2* | 9/2014 | Karasawa ................ | F01M 1/02 |
| | | | | 123/196 R |
| 2004/0029677 | A1* | 2/2004 | Mori ...................... | B60K 6/485 |
| | | | | 477/3 |
| 2005/0003930 | A1* | 1/2005 | Hopper ................. | B60W 10/06 |
| | | | | 477/175 |
| 2013/0280101 | A1* | 10/2013 | Imai ........................ | F04B 49/02 |
| | | | | 417/46 |
| 2013/0319366 | A1 | 12/2013 | Karasawa | |

FOREIGN PATENT DOCUMENTS

| | | |
|---|---|---|
| JP | 2013-185500 A | 9/2013 |
| JP | 2014-227875 A | 12/2014 |
| WO | WO 2012/111096 A1 | 8/2012 |

* cited by examiner

CONTROL DEVICE FOR ELECTRIC MOTOR AND HYDRAULIC PRESSURE SUPPLY SYSTEM

TECHNICAL FIELD

The invention relates to a control device that controls an electric motor for an electric oil pump mounted on an automatic engine-stop vehicle, and relates to a hydraulic pressure supply system.

BACKGROUND ART

An automatic engine-stop vehicle includes a mechanical oil pump that is driven by power of an engine, and an electric oil pump that is driven by electric power supplied from an in-vehicle battery. The automatic engine-stop vehicle operates the mechanical oil pump during the operation of the engine to supply hydraulic pressure to an automatic transmission, and operates the electric oil pump during an automatic stop of the engine, i.e., during idle-stop, to supply hydraulic pressure to the automatic transmission via a check valve (see, e.g., Patent Literature 1).

CITATION LIST

Patent Literature

Patent Literature 1: Japanese Patent Application Publication No. 2013-185500.

SUMMARY OF INVENTION

Technical Problem

In the conventional automatic engine-stop vehicle, when the engine is automatically stopped, the electric oil pump starts operating before the mechanical oil pump is stopped so that a time period in which the electric oil pump and the mechanical oil pump operate concurrently occurs. During the time period of concurrent operations, the mechanical oil pump is in operation and the hydraulic pressure in a pipe on the side of the mechanical oil pump is high, and hence the electric oil pump is not able to open the check valve. In this state, the electric oil pump cannot rotate and an electric motor is brought into a locked state.

Further, during the time period of concurrent operations, the electric oil pump operates with the maximum torque that is able to be output, thus leading to an overloaded state and increasing the amount of generated heat of the electric motor that drives the electric oil pump. In the case where the time period of concurrent operations is short, the electric motor of the electric oil pump does not break down due to the heat generation. In contrast, there is the problem that, in the case where the time period of concurrent operations is maintained for a long time, the breakdown of the electric motor occurs.

The invention has been made in order to solve the above problem, and an object thereof is to prevent heat generation of an electric motor that drives an electric oil pump.
Solution to Problem A control device for an electric motor according to the invention starts supplying electric power to the electric motor to thereby start drive of a second pump before a first pump stops operating, and limits a power-supply current to the electric motor to a predetermined first current or less during the time period between the start of the drive of the second pump and the time when a hydraulic pressure measured by a hydraulic pressure measurement circuit exceeds a prescribed outlet hydraulic pressure serving as an operation stop condition of the first pump.

Advantageous Effects of Invention

According to the invention, the power-supply current to the electric motor is limited to the predetermined first current or less during the time period between the start of the drive of the second pump and the time when the hydraulic pressure measured by the hydraulic pressure measurement circuit exceeds the prescribed outlet hydraulic pressure, thereby suppressing useless current supply to the electric motor during the time period in which the first pump and the second pump operate concurrently and preventing heat generation.

DESCRIPTION OF EMBODIMENTS

In the following, in order to describe the invention in greater detail, embodiments will be described in accordance with the accompanying drawings.

Embodiment 1

Figure 1:
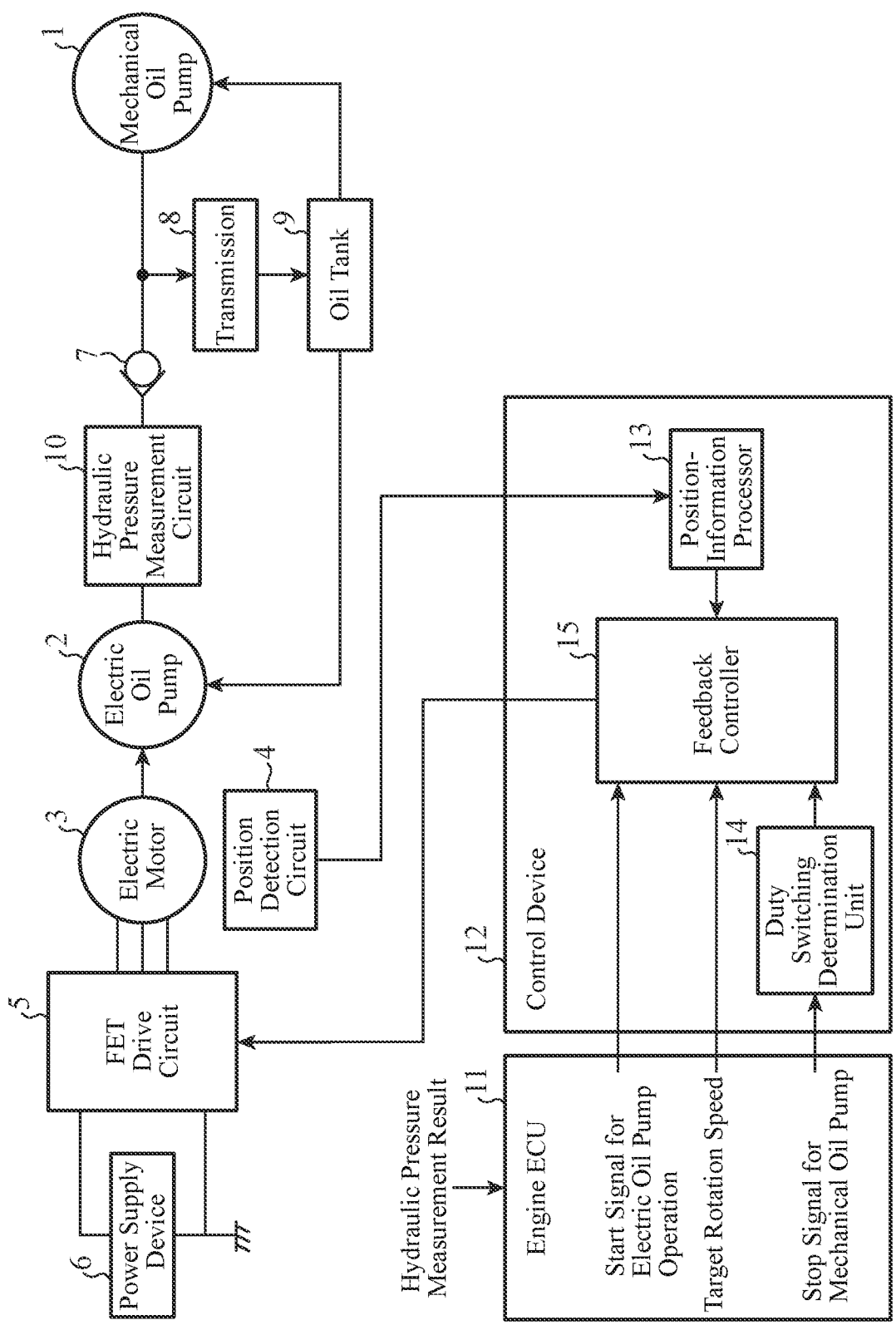
FIG. 1 is a block diagram showing an example of the configuration of a hydraulic pressure supply system according to Embodiment 1 of the invention.

FIG. 1 is a block diagram showing an example of the configuration of a hydraulic pressure supply system according to Embodiment 1 of the invention. The hydraulic pressure supply system supplies hydraulic pressure to hydraulic-pressure receiving equipment from a first pump and a second pump, and the second pump is driven by an electric motor. In each embodiment of the invention, the case where the hydraulic pressure supply system is applied to an automatic engine-stop vehicle will be described as an example. The hydraulic pressure supply system applied to the automatic engine-stop vehicle is configured to supply the hydraulic pressure to a transmission 8 from a mechanical oil pump 1 serving as the first pump and an electric oil pump 2 serving as the second pump, and the electric oil pump 2 is configured to be driven by an electric motor 3.

The hydraulic pressure supply system according to Embodiment 1 includes: the mechanical oil pump 1 that operates with power of an engine; the electric oil pump 2 that operates with electric power of a power supply device 6; the electric motor 3 that drives the electric oil pump 2; a control device 12 that controls the operation of the electric oil pump 2 by manipulating a power-supply voltage or a power-supply current to the electric motor 3; a check valve 7 that is installed at an upstream position relative to a junction pipe at which the outlet-side pipe of the mechanical oil pump 1 and the outlet-side pipe of the electric oil pump 2 meet each other, and that prevents backflow from the mechanical oil pump 1 to the electric oil pump 2; and a hydraulic pressure measurement circuit 10 that measures the hydraulic pressure of the outlet-side pipe of the electric oil pump 2 at an upstream position relative to the check valve 7. The junction pipe at which the outlet-side pipe of the mechanical oil pump 1 and the outlet-side pipe of the electric oil pump 2 meet each other is connected to the transmission 8 provided as hydraulic-pressure receiving equipment.

The mechanical oil pump 1 is driven by the power of the engine, pumps oil from an oil tank 9, increases the hydraulic pressure, and supplies the hydraulic pressure to the transmission 8. The electric oil pump 2 is driven by the electric motor 3, pumps the oil from the oil tank 9, increases the hydraulic pressure, and supplies the hydraulic pressure to the transmission 8.

Since the mechanical oil pump 1 is driven by the power of the engine, during a time period in which the engine is stopped due to idle stop or the like, the mechanical oil pump 1 cannot supply the hydraulic pressure to the transmission 8. To cope with this, during the time period in which the engine is stopped due to the idle stop or the like, the hydraulic pressure is supplied to the transmission 8 by driving the electric oil pump 2 secondarily.

Note that, in the example in FIG. 1, the electric oil pump 2 is structured to be able to rotate in two directions of forward and reverse directions, and hence the check valve 7 is installed such that the electric oil pump 2 does not rotate reversely when the oil flows backward. However, in the case where the electric oil pump 2 is structured to rotate only in one direction and is structured so as not to rotate reversely even when the oil flows backward, the check valve 7 is not necessary.

In addition, in the example in FIG. 1, the mechanical oil pump 1 is structured to rotate only in one direction and is structured so as not to rotate reversely even when the oil flows backward, and hence the check valve is not installed. However, in the case where the mechanical oil pump 1 is structured to be able to rotate in two directions of the forward and reverse directions, it is preferable to install the check valve such that the mechanical oil pump 1 does not rotate reversely when the oil flows backward.

Further, in the example in FIG. 1, the mechanical oil pump 1 is used as the first pump. However, in the case where an electric oil pump having a torque similar to that of the electric oil pump 2 is used as the first pump, the first and second pumps do not rotate reversely, and hence the check valve is not necessary.

The electric motor 3 operates by receiving electric power supply from the power supply device 6 via a FET drive circuit 5, and drives the electric oil pump 2. In the electric motor 3, a position detection circuit 4 that detects information indicative of the rotation position of a rotor is installed. The position detection circuit 4 outputs the detected rotation position information of the rotor to the control device 12.

Note that a three-phase electric motor is used as the electric motor 3 in the example in FIG. 1, but the electric motor 3 is not limited to the three-phase electric motor, and may be any electric motor as long as a rotation speed of the electric motor can be controlled by manipulating the power-supply voltage or the power-supply current.

The power supply device 6 is a battery mounted on the automatic engine-stop vehicle.

The FET drive circuit 5 is a pulse width modulation (PWM) inverter having a switching element such as a field effect transistor (FET) that switches between ON and OFF of voltage applied to the electric motor 3. The FET drive circuit 5 manipulates current passed through the individual phases of the electric motor 3 from the power supply device 6 by switching among the FETs of the individual phases in accordance with FET drive signals of the individual phases received from the control device 12.

The hydraulic pressure measurement circuit 10 includes a pressure sensor that measures the hydraulic pressure in the outlet-side pipe of the electric oil pump 2, and outputs the hydraulic pressure measurement result of the pressure sensor to an engine ECU 11. The pressure sensor is installed in a pipe from the outlet of the electric oil pump 2 to the check valve 7.

The engine ECU 11 is an electronic control unit (ECU) that controls the engine and the transmission 8. The engine ECU 11 receives information indicative of a vehicle speed, the gear position of the transmission 8, and the depression amount of a brake pedal from various sensors of the automatic engine-stop vehicle, and controls the engine and the transmission 8 on the basis of the information.

In Embodiment 1, the engine ECU 11 determines whether or not the information indicative of the vehicle speed, the gear position of the transmission 8, and the depression amount of the brake pedal satisfies a predetermined engine stop condition and, in the case where the information satisfies the engine stop condition, the engine ECU 11 starts getting ready to allow the engine to be stopped, and also outputs a start signal for an electric oil pump operation to start the operation of the electric oil pump 2 to the control device 12.

In addition, the engine ECU 11 receives the measurement result of the hydraulic pressure in the outlet-side pipe of the electric oil pump 2 from the hydraulic pressure measurement circuit 10. In the case where the hydraulic pressure measured by the hydraulic pressure measurement circuit 10 is equal to or larger than a predetermined prescribed outlet hydraulic pressure, the engine ECU 11 determines that the electric oil pump 2 has started operating normally, and stops the engine. When the engine is stopped, the mechanical oil pump 1 is also stopped, and hence the engine ECU 11 outputs a stop signal for the mechanical oil pump indicative of the stop of the mechanical oil pump 1, to the control device 12. The prescribed outlet hydraulic pressure serves as a condition for determining whether to stop the operation of the mechanical oil pump 1.

Further, in the case where the engine stop condition is satisfied, the engine ECU 11 calculates a target rotation speed of the electric motor 3 on the basis of the hydraulic pressure in the outlet-side pipe of the electric oil pump 2 measured by the hydraulic pressure measurement circuit 10, and outputs the target rotation speed to the control device 12. The target rotation speed is the rotation speed of the electric motor 3 that allows supply of the hydraulic pressure required by the transmission 8 during an engine stop from the electric oil pump 2.

The control device 12 includes a position-information processor 13, a Duty switching determination unit 14, and a feedback controller 15.

The position-information processor 13 receives the rotation position information of the rotor detected by the position detection circuit 4, converts the rotation position information into the rotation speed, and outputs the rotation position and the rotation speed to the feedback controller 15.

When the Duty switching determination unit 14 receives the stop signal for the mechanical oil pump from the engine ECU 11, the Duty switching determination unit 14 outputs a command to cancel a constant Duty operation to the feedback controller 15.

The feedback controller 15 receives the current rotation position and rotation speed of the rotor of the electric motor 3 from the position-information processor 13, the command to cancel the constant Duty operation from the Duty switching determination unit 14, and the target rotation speed of the electric motor 3 and the start signal for an electric oil pump operation from the engine ECU 11.

When the feedback controller 15 receives the start signal for an electric oil pump operation from the engine ECU 11, the feedback controller 15 starts operating and starts the constant Duty operation in which the FET drive signal having a pulse width corresponding to a predetermined constant drive Duty ratio is generated and output to the FET drive circuit 5 first. The feedback controller 15 determines a power-supply pattern with respect to each phase from the rotation position, and adjusts the pulse timing of the FET drive signal of each phase.

The predetermined constant drive Duty ratio is set to a value that limits the power-supply current to the electric motor 3 to a first current or less. The first current is set to be equal to or smaller than the current value that allows the continuous operation of the electric motor 3 even when the mechanical oil pump 1 and the electric oil pump 2 operate concurrently.

When the feedback controller 15 receives the command to cancel the constant Duty operation from the Duty switching determination unit 14 during the constant Duty operation, the feedback controller 15 ends the constant Duty operation and starts feedback control. In Embodiment 1, the feedback controller 15 performs the feedback control to cause the current rotation speed of the electric motor 3 to approach the target rotation speed by manipulating the power-supply voltage or the power-supply current to the electric motor 3 by PWM control. That is, the feedback controller 15 calculates the drive Duty ratio corresponding to a deviation between the rotation speed of the electric motor 3 received from the position-information processor 13 and the target rotation speed received from the engine ECU 11, generates the FET drive signal having a pulse width corresponding to the drive Duty ratio, and outputs the FET drive signal to the FET drive circuit 5.

Next, with reference to FIG. 2 and FIG. 3, the operation of the control device 12 will be described.

Figure 2:
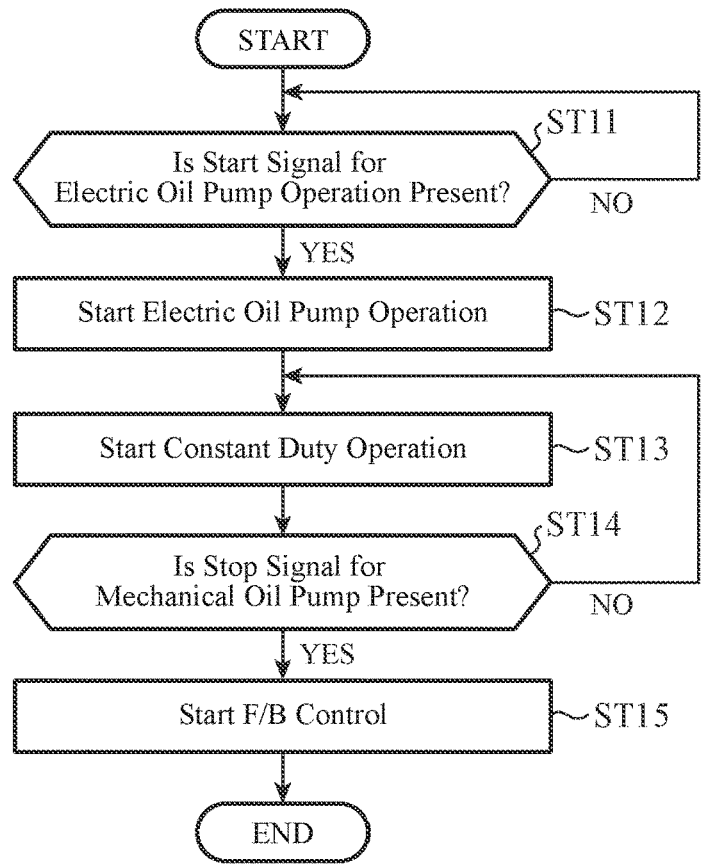
FIG. 2 is a flowchart showing an example of an operation performed by a control device for an electric motor according to Embodiment 1.

FIG. 2 is a flowchart showing an example of the operation of the control device 12. FIG. 3 is a timing chart showing an example of the operation of the hydraulic pressure supply system, and shows temporal changes of the hydraulic pressure of the outlet-side pipe of the mechanical oil pump 1, the hydraulic pressure of the outlet-side pipe of the electric oil pump 2, the power-supply current to the electric motor 3, the control state of the control device 12, and the control state of the engine ECU 11 in this order from the top of a paper sheet.

When the engine ECU 11 determines that the engine stop condition is satisfied, the engine ECU 11 starts getting ready to allow the engine to be stopped, and also outputs the start signal for an electric oil pump operation, and the target rotation speed.

When the feedback controller 15 receives the start signal for an electric oil pump operation from the engine ECU 11 ("YES" in Step ST11), the feedback controller 15 starts supplying electric power to the electric motor 3 to thereby start the operation of the electric oil pump 2 (Step ST12). The feedback controller 15 starts the constant Duty operation first, generates the FET drive signal having the predetermined constant drive Duty ratio, and outputs the FET drive signal to the FET drive circuit 5 (Step ST13). On the other hand, when the feedback controller 15 does not receive the start signal for an electric oil pump operation from the engine ECU 11 ("NO" in Step ST11), the feedback controller 15 keeps the electric oil pump 2 stopped without starting supplying electric power to the electric motor 3.

The mechanical oil pump 1 is in operation during the ready to allow the engine to be stopped, and hence the check valve 7 is subjected to a high hydraulic pressure and is closed, and the electric oil pump 2 cannot rotate. Accordingly, the electric motor 3 is brought into a locked state, and the target rotation speed cannot be reached even when a large current is passed. To cope with this, until the mechanical oil pump 1 is stopped, the electric motor 3 is driven with the drive Duty ratio fixed to a specific value, and a small current is passed. With this, the electric oil pump 2 operates with minimum power, and the prescribed outlet hydraulic pressure serving as an operation stop condition of the mechanical oil pump 1 is secured.

When the engine ECU 11 determines that the hydraulic pressure of the outlet-side pipe of the electric oil pump 2 measured by the hydraulic pressure measurement circuit 10 exceeds the prescribed outlet hydraulic pressure serving as the operation stop condition of the mechanical oil pump 1, the engine ECU 11 stops the engine, and outputs the stop signal for the mechanical oil pump. In the timing chart in FIG. 3, in the case where a state in which the hydraulic pressure of the outlet-side pipe of the electric oil pump 2 exceeds the prescribed outlet hydraulic pressure continues for a predetermined time period (e.g., one second), the engine ECU 11 stops the engine, and outputs the stop signal for the mechanical oil pump.

When the Duty switching determination unit 14 receives the stop signal for the mechanical oil pump from the engine ECU 11 ("YES" in Step ST14), the Duty switching determination unit 14 outputs the command to cancel the constant Duty operation to the feedback controller 15. When the feedback controller 15 receives the command to cancel the constant Duty operation from the Duty switching determination unit 14, the feedback controller 15 switches from the constant Duty operation to the feedback control (Step ST15). On the other hand, when the feedback controller 15 does not receive the command to cancel the constant Duty operation from the Duty switching determination unit 14 ("NO" in Step ST14), the feedback controller 15 continues the constant Duty operation.

In Step ST15, the feedback controller 15 calculates the drive Duty ratio, generates the FET drive signal, and manipulates the power-supply voltage or the power-supply current to the electric motor 3 to cause the rotation speed of the electric motor 3 received from the position-information processor 13 to approach the target rotation speed received from the engine ECU 11.

The check valve 7 is still closed immediately after the start of the feedback control, and hence the electric oil pump 2 cannot easily rotate, and the power-supply current to the electric motor 3 is temporarily increased. However, the hydraulic pressure in the outlet-side pipe of the mechanical oil pump 1 is reduced and the check valve 7 starts to open immediately, and hence the power-supply current to the electric motor 3 is also reduced.

Figure 4:
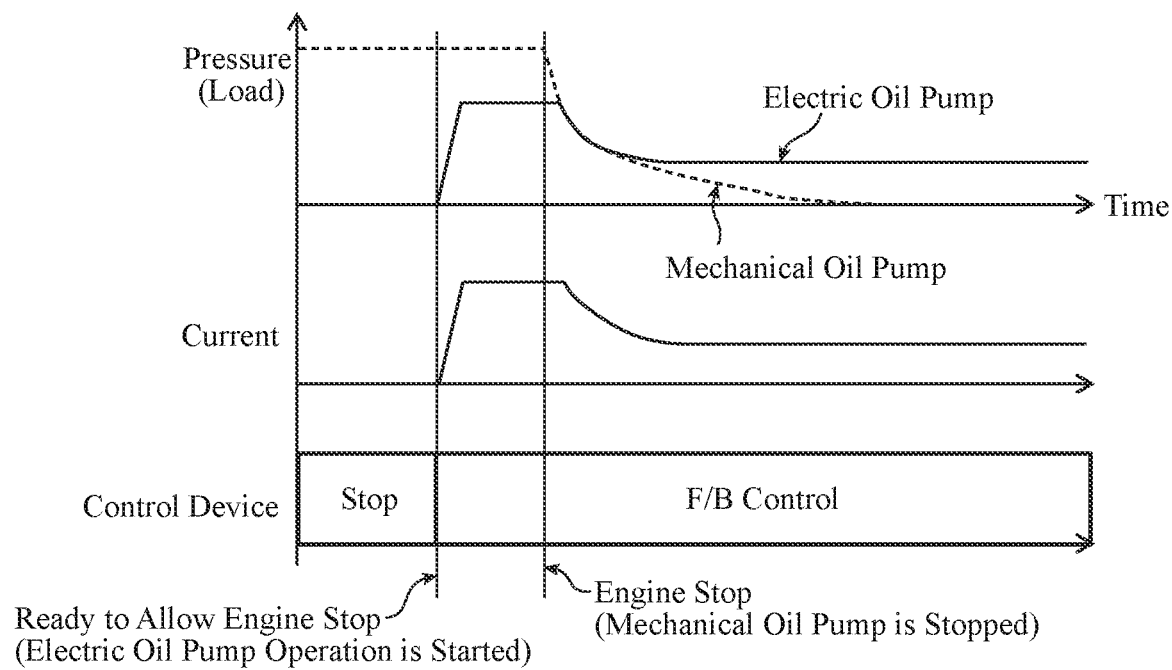
FIG. 4 shows a timing chart of the hydraulic pressure supply system in the case where the control device does not perform a constant Duty operation but performs only feedback control as a reference example of Embodiment 1.

As a reference example, FIG. 4 shows a timing chart of the hydraulic pressure supply system in the case where the control device 12 does not perform the constant Duty operation but performs only the feedback control. FIG. 4 shows the temporal changes of the hydraulic pressure of the outlet-side pipe of the mechanical oil pump 1, the hydraulic pressure of the outlet-side pipe of the electric oil pump 2, the power-supply current to the electric motor 3, and the control state of the control device 12 in this order from the top of the paper sheet. When the feedback controller 15 receives the start signal for an electric oil pump operation from the engine ECU 11, the feedback controller 15 performs the feedback control without performing the constant Duty operation. During a time period between the time to start getting ready for the engine stop and the time when the engine is stopped, the mechanical oil pump 1 is in operation, the hydraulic pressure is high, and the check valve 7 is kept closed. During this time period, the electric motor 3 drives the electric oil pump 2 with the maximum torque that can be output and is overloaded, and hence the power-supply current to the electric motor 3 is increased and the amount of heat generation is increased. In the case where a time period in which the mechanical oil pump 1 and the electric oil pump 2 operate concurrently is short, the electric motor 3 does not break down due to the heat generation. However, in the case where the time period continues for a long time, the heat generation leads to the breakdown of the electric motor 3.

Figure 3:
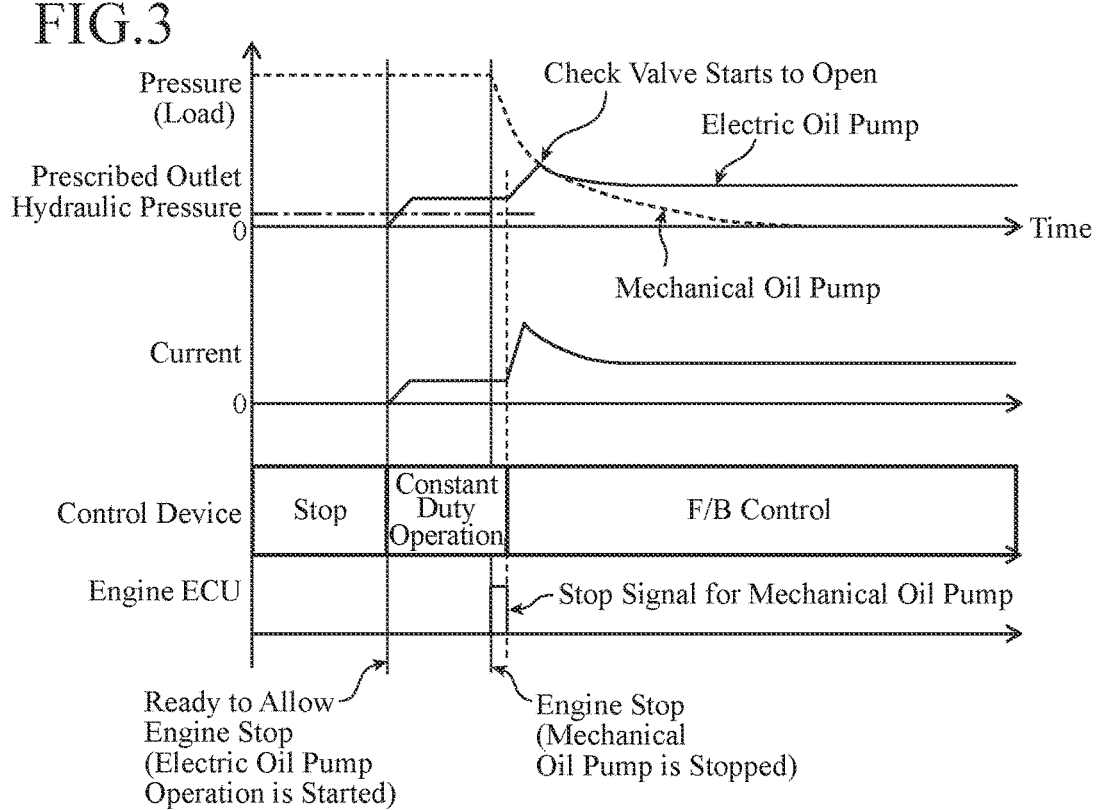
FIG. 3 is a timing chart showing an example of the operation of the hydraulic pressure supply system according to Embodiment 1.

In contrast to this, as shown in the timing chart in FIG. 3, by driving the electric motor 3 at the constant drive Duty ratio and operating the electric oil pump 2 with the minimum power during the time period between the time to start getting ready the engine stop and the time when the engine is stopped, useless current supply to the electric motor 3 is suppressed and the heat generation is prevented.

Next, using FIGS. 5A and 5B, examples of the hardware configurations of the control device 12 will be described.

The individual functions of the position-information processor 13, the Duty switching determination unit 14, and the feedback controller 15 in the control device 12 are implemented by a processor circuit 100. That is, the control device 12 includes the processor circuit 100 for executing the processing shown in the flowchart in FIG. 2. The processor circuit 100 may be dedicated hardware as shown in FIG. 5A, and may also be a processor 101 that executes a program stored in a memory 102 as shown in FIG. 5B.

Figure 5A:
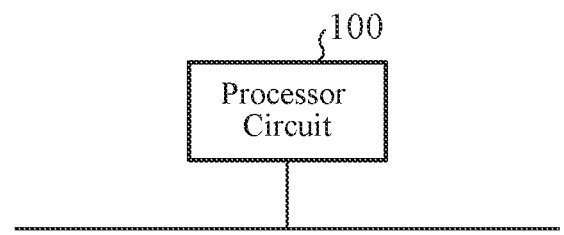
FIGS. 5A and 5B are views showing examples of the hardware configurations of the control device for an electric motor according to Embodiment 1.

As shown in FIG. 5A, in the case where the processor circuit 100 is the dedicated hardware, the processor circuit 100 corresponds to, e.g., a single circuit, a composite circuit, a programmed processor, a parallel-programmed processor, an ASIC (Application Specific Integrated Circuit), an FPGA (Field-Programmable Gate Array), or the combinations thereof. The functions of the position-information processor 13, the Duty switching determination unit 14, and the feedback controller 15 may be implemented by a plurality of processor circuits 100, or the functions of the individual units may also be collectively implemented by one processor circuit 100.

Figure 5B:
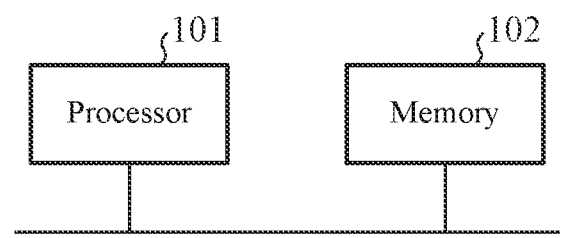

As shown in FIG. 5B, in the case where the processor circuit 100 is the processor 101, the functions of the position-information processor 13, the Duty switching determination unit 14, and the feedback controller 15 are implemented by software, firmware, or the combination of the software and the firmware. The software or the firmware is described as a program and is stored in the memory 102. The processor 101 implements the functions of the individual units by reading and executing the program stored in the memory 102. That is, at the time of execution by the processor 101, the control device 12 includes the memory 102 for storing the program with which the processing shown in the flowchart in FIG. 2 is to be executed eventually. In addition, it can be said that the program causes a computer to execute the procedures or methods of the position-information processor 13, the Duty switching determination unit 14, and the feedback controller 15.

Herein, the processor 101 corresponds to, e.g., a CPU (Central Processing Unit), a central processor, a processing unit, an arithmetic unit, a microprocessor, a microcomputer, or a DSP (Digital Signal Processor).

The memory 102 is a non-volatile or volatile semiconductor memory such as, e.g., a RAM (Random Access Memory), a ROM (Read Only Memory), a flash memory, an EPROM (Erasable Programmable ROM), or an EEPROM (Electrically EPROM).

Note that, with regard to the individual functions of the position-information processor 13, the Duty switching determination unit 14, and the feedback controller 15, part thereof may be implemented by dedicated hardware, and part thereof may be implemented by software or firmware. Thus, the processor circuit 100 in the control device 12 is capable of implementing the individual functions described above by hardware, software, firmware, or the combinations thereof.

In view of the foregoing, according to Embodiment 1, the hydraulic pressure supply system is configured to include: the mechanical oil pump 1; the electric oil pump 2; the electric motor 3 that drives the electric oil pump 2; the control device 12 that controls the operation of the electric oil pump 2 by manipulating the power-supply voltage or the power-supply current to the electric motor 3; the check valve 7 that is installed at an upstream position relative to the junction pipe at which the outlet-side pipe of the mechanical oil pump 1 and the outlet-side pipe of the electric oil pump 2 meet each other and that prevents the backflow from the mechanical oil pump 1 to the electric oil pump 2; and the hydraulic pressure measurement circuit 10 that measures the hydraulic pressure of the outlet-side pipe of the electric oil pump 2 at an upstream position relative to the check valve 7. The control device 12 is configured to start supplying electric power to the electric motor 3 to thereby start the drive of the electric oil pump 2 before the mechanical oil pump 1 stops operating, and limit the power-supply current to the electric motor 3 to the first current or less during the time period between the start of the drive of the electric oil pump 2 and the time when the hydraulic pressure measured by the hydraulic pressure measurement circuit 10 exceeds the prescribed outlet hydraulic pressure serving as the operation stop condition of the mechanical oil pump 1. With this configuration, it is possible to suppress the useless current supply to the electric motor 3 during the time period in which the mechanical oil pump 1 and the electric oil pump 2 operate concurrently, and prevent the heat generation.

In addition, according to Embodiment 1, the control device 12 includes: the position-information processor 13 configured to convert the rotation position information of the rotor of the electric motor 3 into the rotation speed; the Duty switching determination unit 14 configured to output the command to cancel the constant Duty operation when the Duty switching determination unit receives the start signal for an electric oil pump operation from the engine ECU 11 in the case where the hydraulic pressure measured by the hydraulic pressure measurement circuit 10 exceeds the prescribed outlet hydraulic pressure; and the feedback controller 15 configured to calculate the drive Duty ratio and perform the feedback control to cause the rotation speed obtained by the conversion by the position-information processor 13 to approach the target rotation speed by manipulating the power-supply voltage or the power-supply current to the electric motor 3 by the PWM control. The feedback controller 15 fixes the drive Duty ratio to a value corresponding to the first current or less during the time period between the start of the drive of the electric oil pump 2 and receipt of the command to cancel the constant Duty operation. Hence, it is possible to suppress the useless current supply to the electric motor 3 and prevent the heat generation by the simple method without using means for measuring or estimating the power-supply current to the electric motor 3.

Note that, in the above description, the configuration is adopted in which the engine ECU 11 receives the measurement result of the hydraulic pressure from the hydraulic pressure measurement circuit 10, and the stop signal for the mechanical oil pump is output and the feedback controller 15 is switched from the constant Duty operation to the feedback control in the case where the hydraulic pressure exceeds the prescribed outlet hydraulic pressure, but a configuration may also be adopted in which the Duty switching determination unit 14 receives the measurement result of the hydraulic pressure from the hydraulic pressure measurement circuit 10, and the feedback controller 15 is switched from the constant Duty operation to the feedback control in the case where the hydraulic pressure exceeds the prescribed outlet hydraulic pressure.

Embodiment 2

Figure 6:
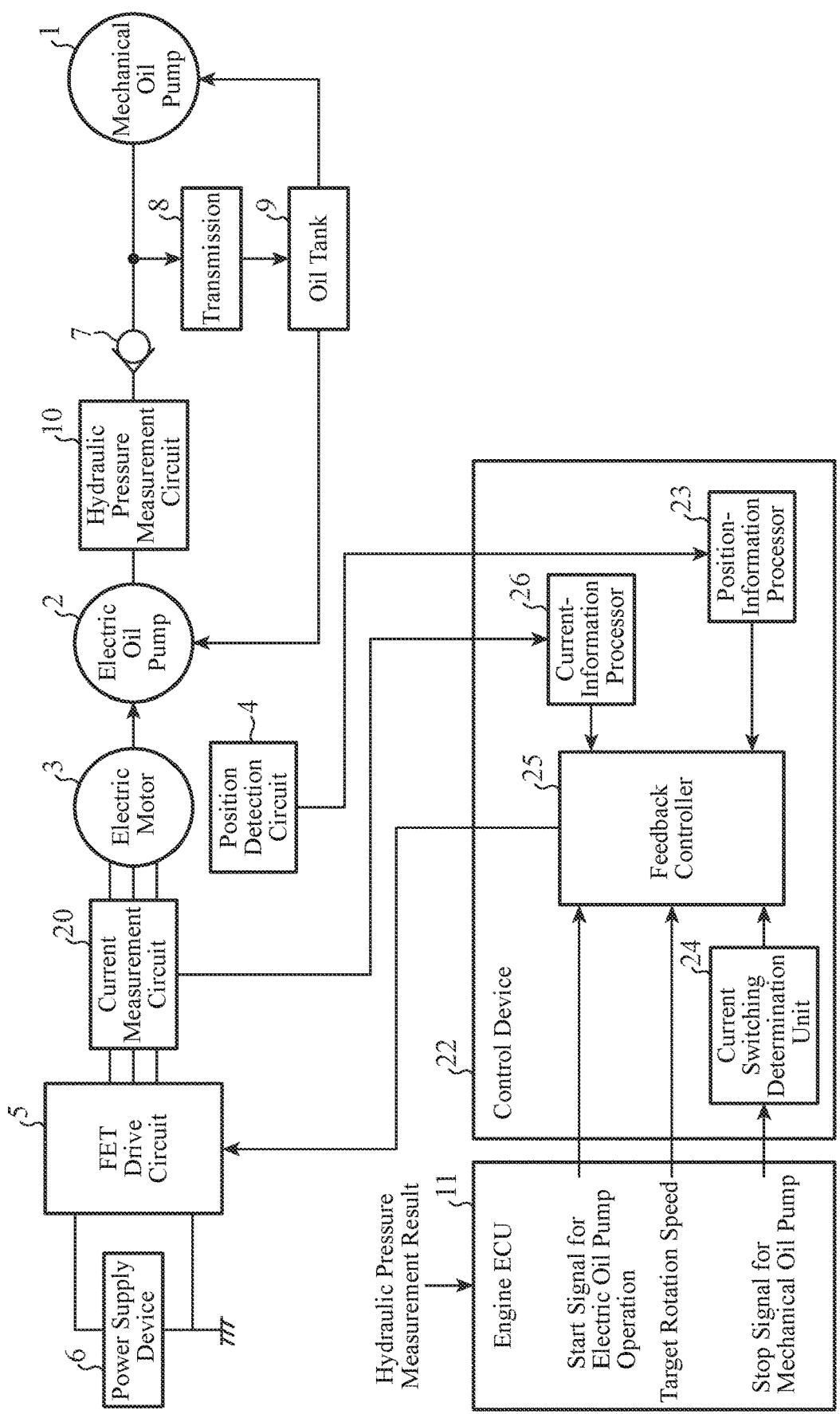
FIG. 6 is a block diagram showing an example of the configuration of a hydraulic pressure supply system according to Embodiment 2 of the invention.

FIG. 6 is a block diagram showing an example of the configuration of a hydraulic pressure supply system according to Embodiment 2 of the invention. The hydraulic pressure supply system according to Embodiment 2 has a configuration in which a current measurement circuit 20 that measures the current that is passed through the electric motor 3 from the FET drive circuit 5 is added to the hydraulic pressure supply system of Embodiment 1 shown in FIG. 1. The current measurement circuit 20 measures the current of each of three phases of the electric motor 3, and outputs the current to a current-information processor 26.

Note that portions in FIG. 6 that are the same as those in FIG. 1 are designated by the same reference numerals, and the description thereof will be omitted. The check valve 7 may or may not be provided.

In Embodiment 2, a control device 22 that controls the electric motor 3 includes a position-information processor 23, a current switching determination unit 24, a feedback controller 25, and the current-information processor 26. The individual functions of the position-information processor 23, the current switching determination unit 24, the feedback controller 25, and the current-information processor 26 in the control device 22 are implemented by the processor circuit 100 shown in FIG. 5A or the processor 101 shown in FIG. 5B.

The current-information processor 26 receives the power-supply current of each phase from the current measurement circuit 20, calculates the power-supply current of the electric motor 3, and outputs the power-supply current to the feedback controller 25.

Note that the current measurement circuit 20 may measure the current of one phase, and the current-information processor 26 may estimate the currents of the remaining two phases based on the current of the one phase. Alternatively, the current measurement circuit 20 may measure the currents of two phases, and the current-information processor 26 may estimate the current of the remaining one phase based on the currents of the two phases.

In addition, the currents may be estimated based on the drive Duty ratio, the voltage of the electric motor 3 and the like in the current-information processor 26 without using the current measurement circuit 20.

The position-information processor 23 receives the rotation position information of the rotor detected by the position detection circuit 4, converts the rotation position information into the rotation speed, and outputs the rotation position and the rotation speed to the feedback controller 25.

When the current switching determination unit 24 receives the stop signal for the mechanical oil pump from the engine ECU 11, the current switching determination unit 24 outputs a command to switch a current upper limit value to the feedback controller 25.

The feedback controller 25 receives the current rotation position and rotation speed of the rotor of the electric motor 3 from the position-information processor 23, the command to switch the current upper limit value from the current switching determination unit 24, the power-supply current of the electric motor 3 from the current-information processor 26, and the target rotation speed of the electric motor 3 and the start signal for an electric oil pump operation from the engine ECU 11.

The feedback controller 25 performs the feedback control to cause the current rotation speed of the electric motor 3 to approach the target rotation speed by manipulating the power-supply voltage or the power-supply current to the electric motor 3 by the PWM control. At this point, the feedback controller 25 sets a predetermined first current as the current upper limit value first, and starts first feedback control. In the first feedback control, the feedback controller 25 limits the drive Duty ratio such that the power-supply current of the electric motor 3 received from the current-information processor 26 is equal to or smaller than the first current.

When the feedback controller 25 receives the command to switch the current upper limit value from the current switching determination unit 24 during the first feedback control, the feedback controller 25 sets a predetermined second current as the current upper limit value, and starts second feedback control. In the second feedback control, the feedback controller 25 limits the drive Duty ratio such that the power-supply current of the electric motor 3 received from the current-information processor 26 is equal to or smaller than the second current.

The current value of the first current is set to be equal to or smaller than a current value that allows the continuous operation of the electric motor 3 even when the mechanical oil pump 1 and the electric oil pump 2 concurrently keep operating. The current value of the second current is larger than that of the first current, and is set to be equal to or larger than a current value that allows supply of the hydraulic pressure required by the transmission 8 during the engine stop from the electric oil pump 2.

Next, with reference to FIG. 7 and FIG. 8, the operation of the control device 22 will be described.

Figure 7:
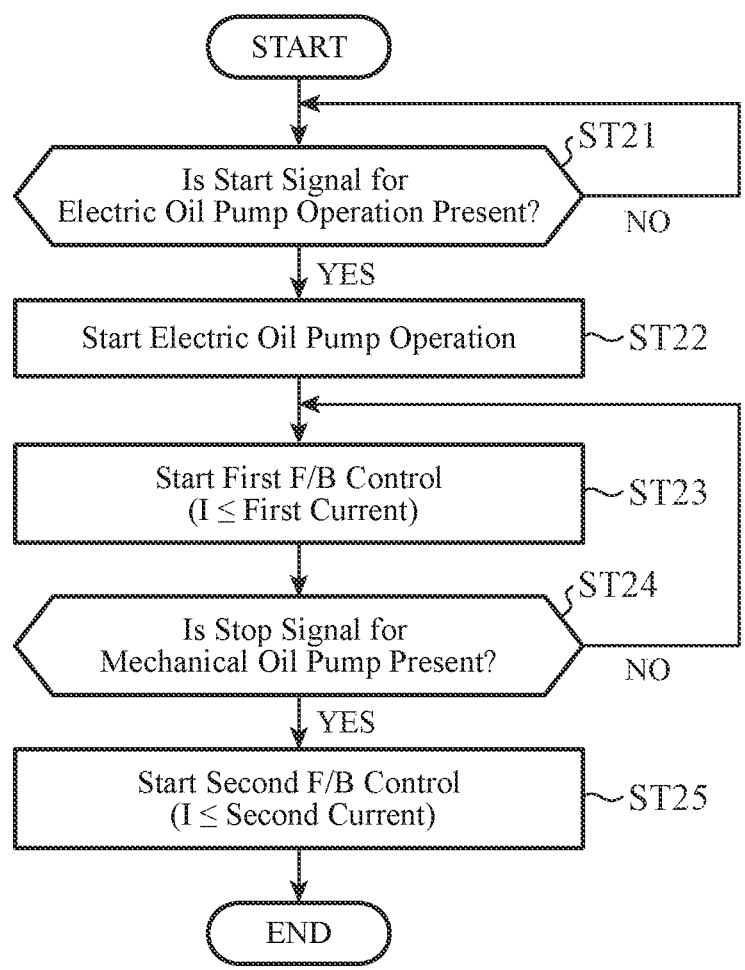
FIG. 7 is a flowchart showing an example of the operation performed by a control device for an electric motor according to Embodiment 2.
Figure 8:
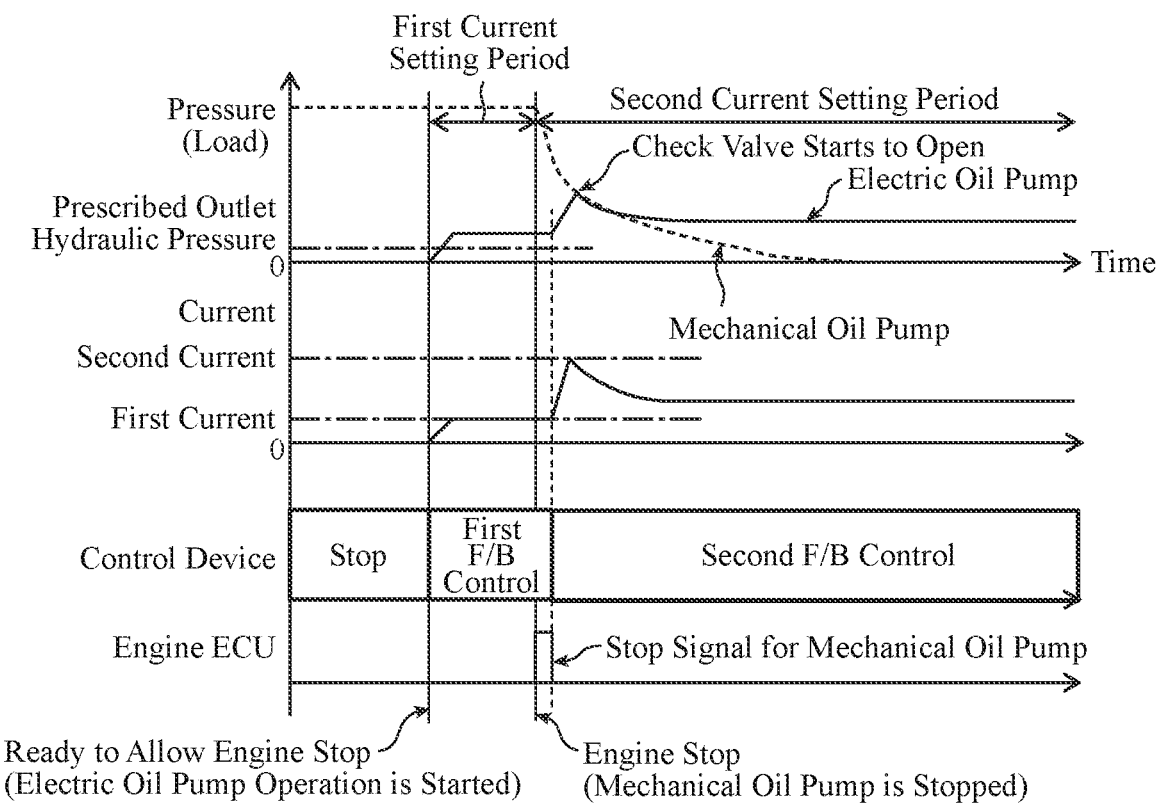
FIG. 8 is a timing chart showing an example of the operation of the hydraulic pressure supply system according to Embodiment 2.

FIG. 7 is a flowchart showing an example of the operation of the control device 22. FIG. 8 is a timing chart showing an example of the operation of the hydraulic pressure supply system, and shows the temporal changes of the hydraulic pressure of the outlet-side pipe of the mechanical oil pump 1, the hydraulic pressure of the outlet-side pipe of the electric oil pump 2, the power-supply current to the electric motor 3, the control state of the control device 22, and the control state of the engine ECU 11 in this order from the top of the paper sheet.

Similarly to Embodiment 1, when the engine ECU 11 determines that the engine stop condition is satisfied, the engine ECU 11 starts getting ready to allow the engine to be stopped, and also outputs the start signal for an electric oil pump operation, and the target rotation speed.

When the feedback controller 25 receives the start signal for an electric oil pump operation from the engine ECU 11 ("YES" in Step ST21), the feedback controller 25 starts the energization of the electric motor 3 to thereby start supplying electric power to the electric oil pump 2 (Step ST22). The feedback controller 25 starts the first feedback control first, and sets the predetermined first current as the current upper limit value. Subsequently, the feedback controller 25 calculates the drive Duty ratio from the deviation between the target rotation speed received from the engine ECU 11 and the current rotation speed received from the position-information processor 23, reduces the drive Duty ratio such that a power-supply current I is equal to or smaller than the first current in the case where the power-supply current I of the electric motor 3 received from the current-information processor 26 is close to the first current, then generates the FET drive signal corresponding to the drive Duty ratio, and outputs the FET drive signal to the FET drive circuit 5 (Step ST23). On the other hand, when the feedback controller 25 does not receive the start signal for an electric oil pump operation from the engine ECU 11 ("NO" in Step ST21), the feedback controller 25 keeps the electric oil pump 2 stopped without starting supplying electric power to the electric motor 3.

Similarly to Embodiment 1, also in Embodiment 2, the mechanical oil pump 1 is in operation during the ready to allow the engine to be stopped, and hence the check valve 7 is subjected to the high hydraulic pressure and is closed, and the electric oil pump 2 cannot rotate. Accordingly, the electric motor 3 is brought into the locked state, and the target rotation speed cannot be reached. To cope with this, until the mechanical oil pump 1 is stopped, the power-supply current to the electric motor 3 is limited to the first current or less, and the electric oil pump 2 is operated. With this, the prescribed outlet hydraulic pressure serving as the operation stop condition of the mechanical oil pump 1 is secured with the minimum power.

Similarly to Embodiment 1, when the engine ECU 11 determines that the hydraulic pressure of the outlet-side pipe of the electric oil pump 2 measured by the hydraulic pressure measurement circuit 10 exceeds the prescribed outlet hydraulic pressure serving as the operation stop condition of the mechanical oil pump 1, the engine ECU 11 stops the engine, and outputs the stop signal for the mechanical oil pump. In the timing chart in FIG. 8, in the case where the state in which the hydraulic pressure of the outlet-side pipe of the electric oil pump 2 exceeds the prescribed outlet hydraulic pressure continues for the predetermined time period (e.g., one second), the engine ECU 11 stops the engine, and outputs the stop signal for the mechanical oil pump.

When the current switching determination unit 24 receives the stop signal for the mechanical oil pump from the engine ECU 11 ("YES" in Step ST24), the current switching determination unit 24 outputs the command to switch the current upper limit value to the feedback controller 25. When the feedback controller 25 receives the command to switch the current upper limit value from the current switching determination unit 24, the feedback controller 25 changes the current upper limit value from the first current to the second current, and performs the second feedback control (Step ST25). The feedback controller 25 calculates the drive Duty ratio from the deviation between the target rotation speed received from the engine ECU 11 and the current rotation speed received from the position-information processor 23, reduces the calculated drive Duty ratio in the case where the power-supply current I of the electric motor 3 received from the current-information processor 26 is close to the second current, then generates the FET drive signal corresponding to the drive Duty ratio, and outputs the FET drive signal to the FET drive circuit 5. On the other hand, when the feedback controller 25 does not receive the command to switch the current upper limit value from the current switching determination unit 24 ("NO" in Step ST24), the feedback controller 25 continues the first feedback control.

The check valve 7 is still closed immediately after the start of the second feedback control, and hence the electric oil pump 2 cannot easily rotate and the power-supply current to the electric motor 3 is temporarily increased. Then, the hydraulic pressure in the outlet-side pipe of the mechanical oil pump 1 is reduced and the check valve 7 starts to open immediately, and hence the power-supply current to the electric motor 3 is also reduced.

In view of the foregoing, according to Embodiment 2, the control device 22 includes: the current-information processor 26 configured to measure or estimate the power-supply current to the electric motor 3; the position-information processor 23 configured to convert the rotation position information of the rotor of the electric motor 3 into the rotation speed; the current switching determination unit 24 configured to output the command to switch the current upper limit value when the current switching determination unit 24 receives the start signal for an electric oil pump operation from the engine ECU 11 in the case where the hydraulic pressure measured by the hydraulic pressure measurement circuit 10 exceeds the prescribed outlet hydraulic pressure; and the feedback controller 25 configured to perform the feedback control to cause the rotation speed obtained by the conversion in the position-information processor 23 to approach the target rotation speed by manipulating the power-supply voltage or the power-supply current to the electric motor 3. The feedback controller 25 limits the power-supply current to the electric motor 3 to the first current or less during the time period between the start of the drive of the electric oil pump 2 and receipt of the command to switch the current upper limit value, and, after the receipt of the command to switch the current upper limit value, limits the power-supply current to the electric motor 3 to the second current or less where the second current is larger than the first current. Hence, it is possible to suppress the useless current supply to the electric motor 3 and prevent the heat generation.

Note that, in the above description, the configuration is adopted in which the engine ECU 11 receives the measurement result of the hydraulic pressure from the hydraulic pressure measurement circuit 10, and the stop signal for the mechanical oil pump is output and the current upper limit value of the feedback control of the feedback controller 25 is switched in the case where the hydraulic pressure exceeds the prescribed outlet hydraulic pressure, but a configuration may also be adopted in which the current switching determination unit 24 receives the measurement result of the hydraulic pressure from the hydraulic pressure measurement circuit 10, and the current upper limit value of the feedback control of the feedback controller 25 is switched in the case where the hydraulic pressure exceeds the prescribed outlet hydraulic pressure.

Embodiment 3

In each of Embodiments 1 and 2, the configuration is adopted in which the feedback control of the rotation speed of the electric motor 3 is performed. In the present Embodiment 3, a configuration is adopted in which the feedback control of the hydraulic pressure of the outlet-side pipe of the electric oil pump 2 that is substantially proportional to the rotation speed of the electric motor 3 is performed.

Figure 9:
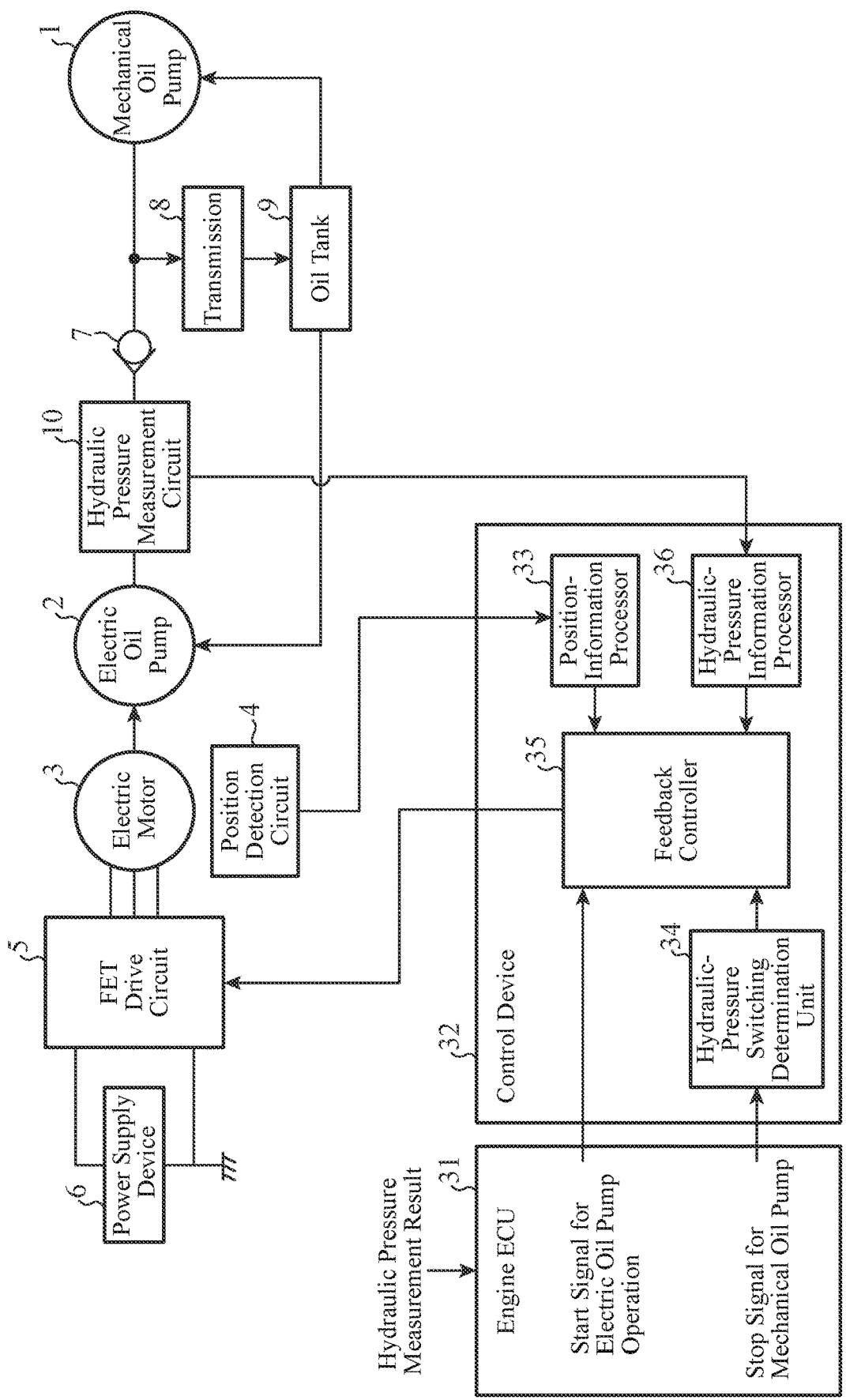
FIG. 9 is a block diagram showing an example of the configuration of a hydraulic pressure supply system according to Embodiment 3 of the invention.

FIG. 9 is a block diagram showing an example of the configuration of a hydraulic pressure supply system according to Embodiment 3 of the invention. The hydraulic pressure supply system according to Embodiment 3 has the same configuration as that of the hydraulic pressure supply system of Embodiment 1 shown in FIG. 1, and portions in FIG. 9 that are the same as those in FIG. 1 are designated by the same reference numerals and the description thereof will be omitted. Note that the hydraulic pressure measurement circuit 10 outputs the measurement result of the hydraulic pressure of the outlet-side pipe of the electric oil pump 2 not only to an engine ECU 31 but also to a control device 32.

The check valve 7 may or may not be provided.

In Embodiment 3, the control device 32 that controls the electric motor 3 includes a position-information processor 33, a hydraulic-pressure switching determination unit 34, a feedback controller 35, and a hydraulic-pressure information processor 36. The individual functions of the position-information processor 33, the hydraulic-pressure switching determination unit 34, the feedback controller 35, and the hydraulic-pressure information processor 36 in the control device 32 are implemented by the processor circuit 100 shown in FIG. 5A or the processor 101 shown in FIG. 5B.

The position-information processor 33 receives the rotation position information of the rotor detected by the position detection circuit 4, and outputs the rotation position information to the feedback controller 35.

When the hydraulic-pressure switching determination unit 34 receives the stop signal for the mechanical oil pump from the engine ECU 31, the hydraulic-pressure switching determination unit 34 outputs a command to switch a target hydraulic pressure serving as the target value of the feedback control to the feedback controller 35.

The hydraulic-pressure information processor 36 receives the measurement result of the hydraulic pressure of the outlet-side pipe of the electric oil pump 2 from the hydraulic pressure measurement circuit 10, and outputs the measurement result thereof to the feedback controller 35.

The feedback controller 35 receives the current rotation position of the rotor of the electric motor 3 from the position-information processor 33, the command to switch the target hydraulic pressure from the hydraulic-pressure switching determination unit 34, the current hydraulic pressure of the outlet-side pipe of the electric oil pump 2 from the hydraulic-pressure information processor 36, and the start signal for an electric oil pump operation from the engine ECU 31.

The feedback controller 35 performs the feedback control to cause the current hydraulic pressure of the outlet-side pipe of the electric oil pump 2 to approach the target hydraulic pressure by manipulating the power-supply voltage or the power-supply current to the electric motor 3 by the PWM control. At this point, the feedback controller 35 sets a predetermined first hydraulic pressure as the target hydraulic pressure first, and starts first feedback control.

When the feedback controller 35 receives the command to switch the target hydraulic pressure from the hydraulic-pressure switching determination unit 34 during the first feedback control, the feedback controller 35 sets a predetermined second hydraulic pressure as the target hydraulic pressure, and starts second feedback control.

The first hydraulic pressure is set to be equal to or larger than the minimum value of the hydraulic pressure required by the transmission 8 during the engine stop and equal to or larger than the prescribed outlet hydraulic pressure serving as the operation stop condition of the mechanical oil pump 1. The second hydraulic pressure is larger than the first hydraulic pressure, and is a normal hydraulic pressure required by the transmission 8 during the engine stop.

Next, with reference to FIG. 10 and FIG. 11, the operation of the control device 32 will be described.

Figure 10:
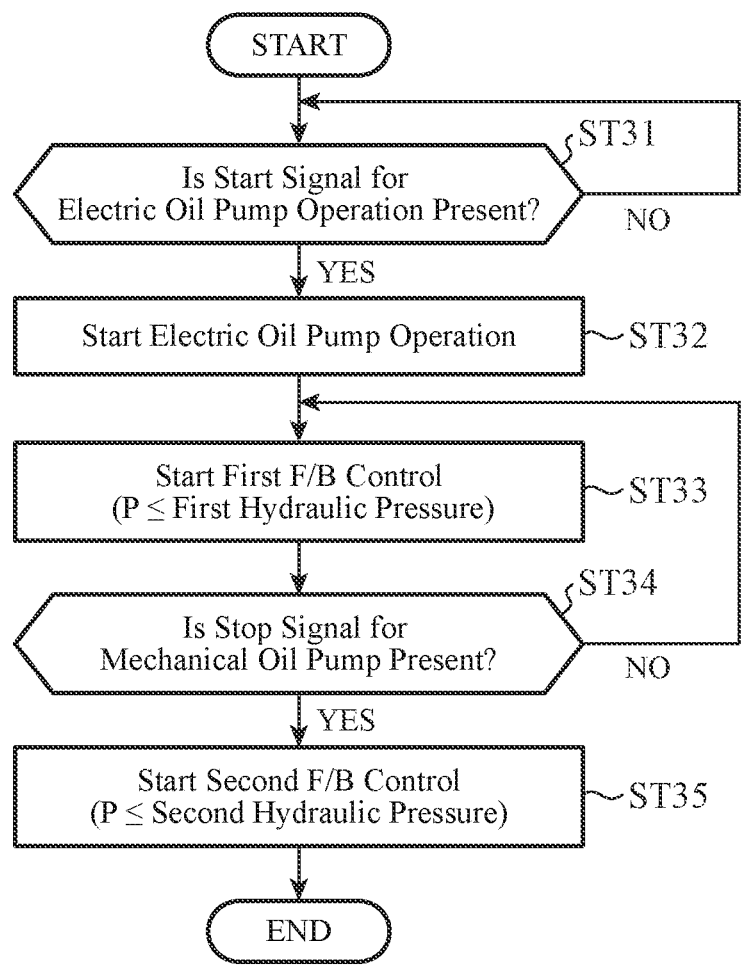
FIG. 10 is a flowchart showing an example of the operation performed by a control device for an electric motor according to Embodiment 3.
Figure 11:
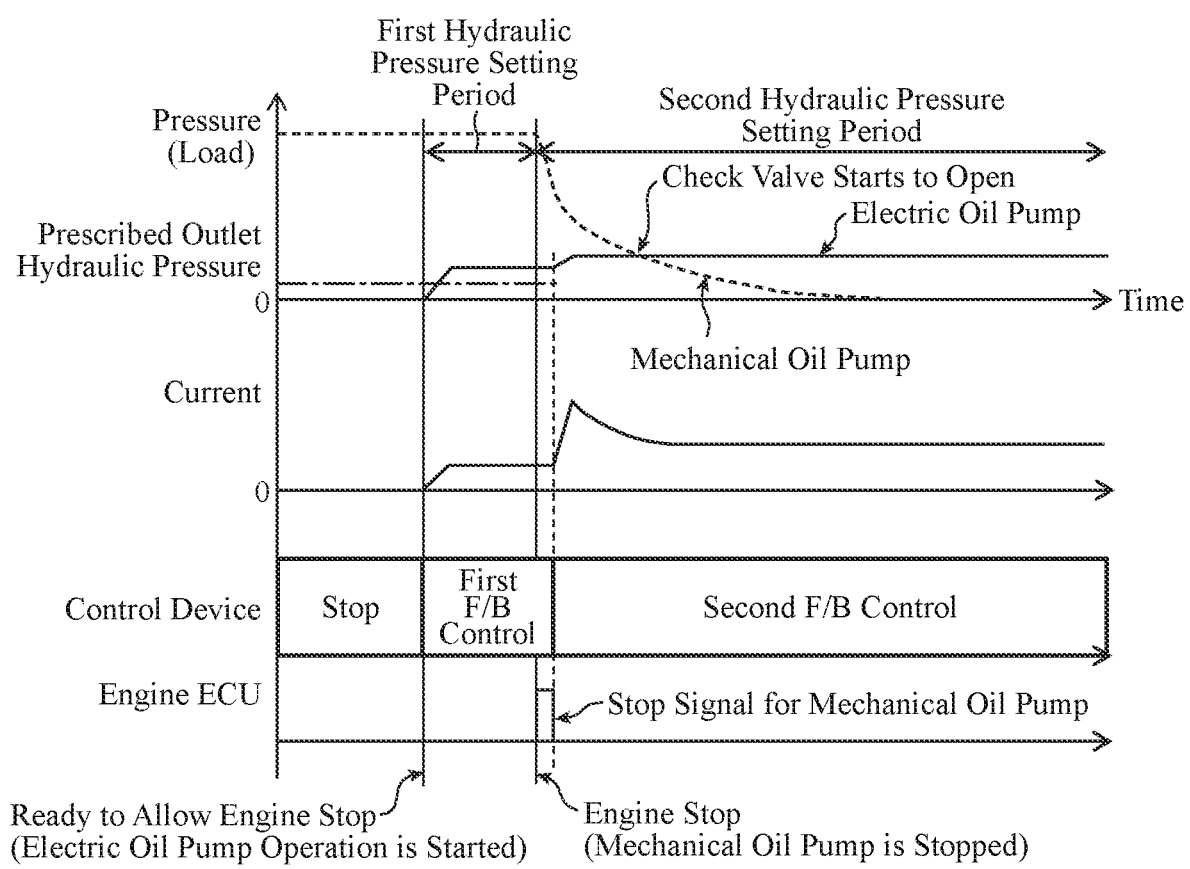
FIG. 11 is a timing chart showing an example of the operation of the hydraulic pressure supply system according to Embodiment 3.

FIG. 10 is a flowchart showing an example of the operation of the control device 32. FIG. 11 is a timing chart showing an example of the operation of the hydraulic pressure supply system, and shows the temporal changes of the hydraulic pressure of the outlet-side pipe of the mechanical oil pump 1, the hydraulic pressure of the outlet-side pipe of the electric oil pump 2, the power-supply current to the electric motor 3, the control state of the control device 32, and the control state of the engine ECU 31 in this order from the top of the paper sheet.

Similarly to Embodiment 1, when the engine ECU 31 determines that the engine stop condition is satisfied, the engine ECU 31 starts getting ready for the engine stop, and also outputs the start signal for an electric oil pump operation.

When the feedback controller 35 receives the start signal for an electric oil pump operation from the engine ECU 31 ("YES" in Step ST31), the feedback controller 35 starts supplying electric power to the electric motor 3 to thereby start the operation of the electric oil pump 2 (Step ST32). The feedback controller 35 starts the first feedback control first, and sets the predetermined first hydraulic pressure as the target hydraulic pressure. Subsequently, the feedback controller 35 calculates the drive Duty ratio from the deviation between a current hydraulic pressure P of the outlet-side pipe of the electric oil pump 2 received from the hydraulic-pressure information processor 36 and the first hydraulic pressure, generates the FET drive signal corresponding to the drive Duty ratio, and outputs the FET drive signal to the FET drive circuit 5 (Step ST33). On the other hand, when the feedback controller 35 does not receive the start signal for an electric oil pump operation from the engine ECU 31 ("NO" in Step ST31), the feedback controller 35 keeps the electric oil pump 2 stopped without starting supplying electric power to the electric motor 3.

Similarly to Embodiments 1 and 2, also in Embodiment 3, the mechanical oil pump 1 is in operation during the ready to allow the engine to be stopped, and hence the check valve 7 is subjected to the high hydraulic pressure and is closed, and the electric oil pump 2 cannot rotate. Accordingly, the electric motor 3 is brought into the locked state, and the normal hydraulic pressure required by the transmission 8 during the engine stop cannot be supplied. To cope with this, until the mechanical oil pump 1 is stopped, the electric oil pump 2 is operated to cause the hydraulic pressure of the outlet-side pipe to approach the first hydraulic pressure. With this, the prescribed outlet hydraulic pressure serving as the operation stop condition of the mechanical oil pump 1 is secured with the minimum power.

Similarly to Embodiment 1, when the engine ECU 31 determines that the hydraulic pressure of the outlet-side pipe of the electric oil pump 2 measured by the hydraulic pressure measurement circuit 10 exceeds the prescribed outlet hydraulic pressure serving as the operation stop condition of the mechanical oil pump 1, the engine ECU 31 stops the engine, and outputs the stop signal for the mechanical oil pump. In the timing chart in FIG. 11, in the case where the state in which the hydraulic pressure of the outlet-side pipe of the electric oil pump 2 exceeds the prescribed outlet hydraulic pressure continues for the predetermined time period (e.g., one second), the engine ECU 31 stops the engine, and outputs the stop signal for the mechanical oil pump.

When the hydraulic-pressure switching determination unit 34 receives the stop signal for the mechanical oil pump from the engine ECU 31 ("YES" in Step ST34), the hydraulic-pressure switching determination unit 34 outputs the command to switch the target hydraulic pressure to the feedback controller 35. When the feedback controller 35 receives the command to switch the target hydraulic pressure from the hydraulic-pressure switching determination unit 34, the feedback controller 35 changes the target hydraulic pressure from the first hydraulic pressure to the second hydraulic pressure, and performs the second feedback control (Step ST35). The feedback controller 35 calculates the drive Duty ratio from the deviation between the current hydraulic pressure P of the outlet-side pipe of the electric oil pump 2 received from the hydraulic-pressure information processor 36 and the second hydraulic pressure, generates the FET drive signal corresponding to the drive Duty ratio, and outputs the FET drive signal to the FET drive circuit 5. On the other hand, when the feedback controller 35 does not receive the command to switch the target hydraulic pressure from the hydraulic-pressure switching determination unit 34 ("NO" in Step ST34), the feedback controller 35 continues the first feedback control.

The check valve 7 is still closed immediately after the start of the second feedback control, and hence the electric oil pump 2 cannot easily rotate and the power-supply current to the electric motor 3 is temporarily increased. However, the hydraulic pressure in the outlet-side pipe of the mechanical oil pump 1 is reduced and the check valve 7 starts to open immediately, and hence the power-supply current to the electric motor 3 is also reduced.

In view of the foregoing, according to Embodiment 3, the control device 32 includes: the hydraulic-pressure switching determination unit 34 configured to output the command to switch the target hydraulic pressure when the hydraulic-pressure switching determination unit 34 receives the start signal for an electric oil pump operation from the engine ECU 31 in the case where the hydraulic pressure measured by the hydraulic pressure measurement circuit 10 exceeds the prescribed outlet hydraulic pressure; and the feedback controller 35 configured to perform the feedback control to cause the hydraulic pressure measured by the hydraulic pressure measurement circuit 10 to approach the target hydraulic pressure by manipulating the power-supply voltage or the power-supply current to the electric motor 3. The feedback controller 35 sets the target hydraulic pressure to the first hydraulic pressure that is equal to or larger than the minimum value of the hydraulic pressure required by the transmission 8 and is equal to or larger than the prescribed outlet hydraulic pressure during the time period between the start of the drive of the electric oil pump 2 and receipt of the command to switch the target hydraulic pressure, and sets the target hydraulic pressure to the second hydraulic pressure that is larger than the first hydraulic pressure after the receipt of the command to switch the target hydraulic pressure. Hence, it is possible to suppress the useless current supply by suppressing the useless rotation of the electric motor 3 at the hydraulic pressure higher than the target hydraulic pressure, and to prevent the heat generation.

Note that, in the above description, the configuration is adopted in which the engine ECU 31 receives the measurement result of the hydraulic pressure from the hydraulic pressure measurement circuit 10, and the stop signal for the mechanical oil pump is output and the target hydraulic pressure of the feedback control of the feedback controller 35 is switched in the case where the hydraulic pressure exceeds the prescribed outlet hydraulic pressure, but a configuration may also be adopted in which the hydraulic-pressure switching determination unit 34 receives the measurement result of the hydraulic pressure via the hydraulic-pressure information processor 36, and the target hydraulic pressure of the feedback control of the feedback controller 35 is switched in the case where the hydraulic pressure exceeds the prescribed outlet hydraulic pressure.

Embodiment 4

In each of Embodiments 1 to 3 described above, the configuration is adopted in which, when the hydraulic pressure of the outlet-side pipe of the electric oil pump 2 exceeds the prescribed outlet hydraulic pressure and the mechanical oil pump 1 is stopped, the control method for the electric motor 3 is switched immediately. In each of the present Embodiment 4 and Embodiments 5 and 6 described later, a configuration is adopted in which the control method for the electric motor 3 is switched after a lapse of a predetermined waiting period starting from the time when the hydraulic pressure of the outlet-side pipe of the electric oil pump 2 exceeds the prescribed outlet hydraulic pressure and the mechanical oil pump 1 is stopped.

Figure 12:
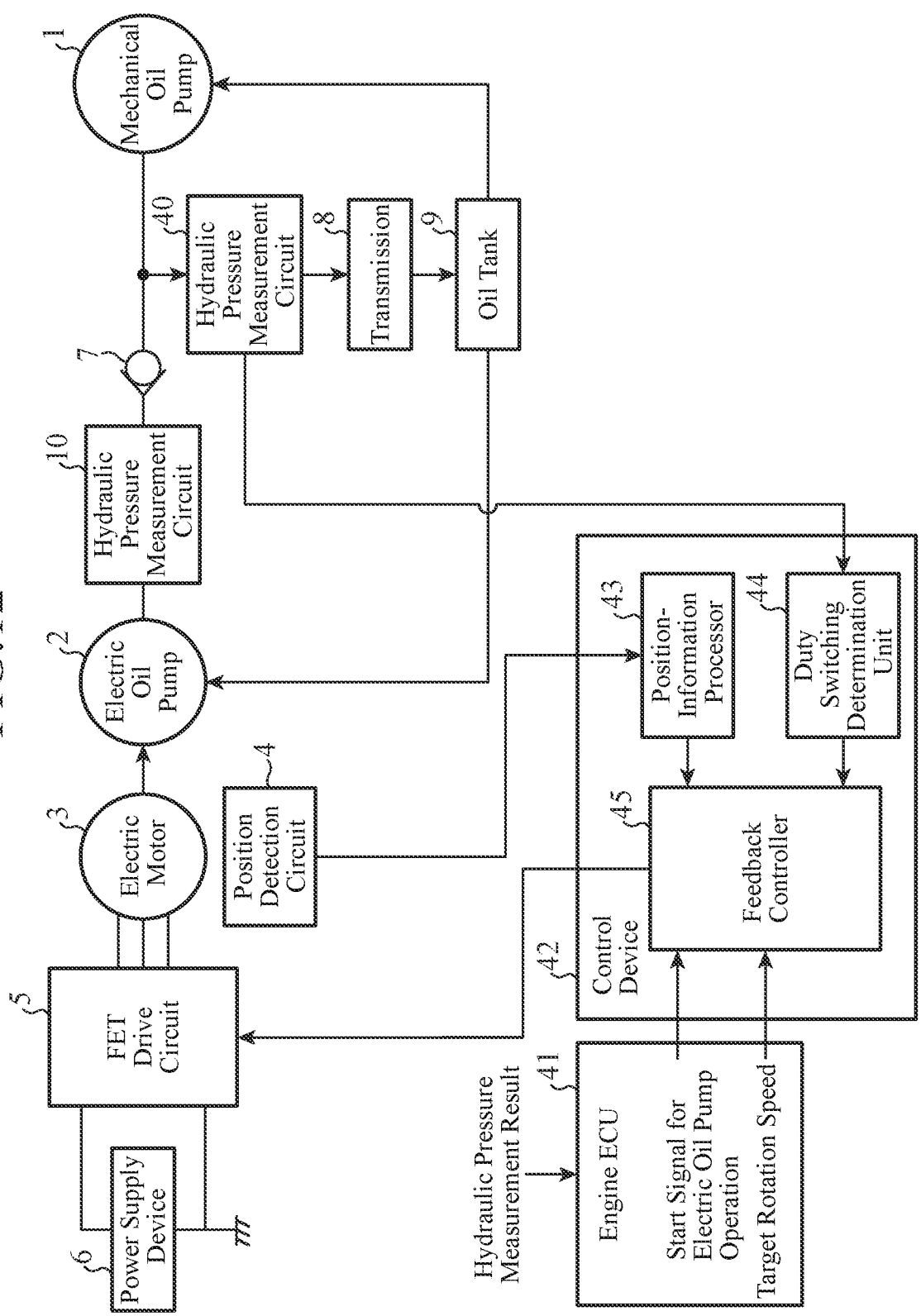
FIG. 12 is a block diagram showing an example of the configuration of a hydraulic pressure supply system according to Embodiment 4 of the invention.

FIG. 12 is a block diagram showing an example of the configuration of a hydraulic pressure supply system according to Embodiment 4 of the invention. The hydraulic pressure supply system according to Embodiment 4 has a configuration in which a hydraulic pressure measurement circuit 40 is added to the hydraulic pressure supply system of Embodiment 1 shown in FIG. 1. The hydraulic pressure measurement circuit 40 includes a pressure sensor that measures the hydraulic pressure to be supplied to the transmission 8 as the hydraulic pressure-supplied equipment, and outputs the hydraulic pressure measurement result of the pressure sensor to a control device 42. The pressure sensor is installed at the joint pipe at which the outlet-side pipe of the mechanical oil pump 1 and the outlet-side pipe of the electric oil pump 2 meet each other.

Note that, portions in FIG. 12 that are the same as those in FIG. 1 are designated by the same reference numerals, and the description thereof will be omitted. The check valve 7 may or may not be provided.

In Embodiment 4, the control device 42 that controls the electric motor 3 includes a position-information processor 43, a Duty switching determination unit 44, and a feedback controller 45. The individual functions of the position-information processor 43, the Duty switching determination unit 44, and the feedback controller 45 in the control device 42 are implemented by the processor circuit 100 shown in FIG. 5A or the processor 101 shown in FIG. 5B.

The position-information processor 43 receives the rotation position information of the rotor detected by the position detection circuit 4, converts the rotation position information into the rotation speed, and outputs the rotation position and the rotation speed to the feedback controller 45.

The Duty switching determination unit 44 receives the measurement result of the hydraulic pressure in the junction pipe of the mechanical oil pump 1 and the electric oil pump 2 from the hydraulic pressure measurement circuit 40. In the case where the hydraulic pressure of the junction pipe is equal to or smaller than a predetermined prescribed junction hydraulic pressure, the Duty switching determination unit 44 outputs the command to cancel the constant Duty operation to the feedback controller 45.

The prescribed junction hydraulic pressure of the junction pipe is set to be equal to or smaller than the hydraulic pressure that allows the continuous operation of the electric motor 3 that drives the electric oil pump 2, and is set to, e.g., a value obtained by adding a predetermined hydraulic pressure to the normal hydraulic pressure required by the transmission 8 during the engine stop such that the value has a margin. In addition, the prescribed junction hydraulic pressure has a value that is larger than that of the prescribed outlet hydraulic pressure serving as the operation stop condition of the mechanical oil pump 1.

Further, a time period between the time when the mechanical oil pump 1 is stopped at the same time as the engine stop and the time when the hydraulic pressure of the junction pipe is reduced to the prescribed junction hydraulic pressure or less, corresponds to the waiting period described above.

The feedback controller 45 receives the current rotation position and rotation speed of the rotor of the electric motor 3 from the position-information processor 43, the command to cancel the constant Duty operation from the Duty switching determination unit 44, and the target rotation speed of the electric motor 3 and the start signal for an electric oil pump operation from the engine ECU 41.

Similarly to the feedback controller 15 of Embodiment 1 described above, when the feedback controller 45 receives the start signal for an electric oil pump operation from the engine ECU 41, the feedback controller 45 starts operating, and starts a constant Duty operation in which the FET drive signal having the pulse width corresponding to the predetermined constant drive Duty ratio is generated and output to the FET drive circuit 5 first.

When the feedback controller 45 receives the command to cancel the constant Duty operation from the Duty switching determination unit 44 during the constant Duty operation, the feedback controller 45 ends the constant Duty operation and starts the feedback control.

Next, with reference to FIG. 13 and FIG. 14, the operation of the control device 42 will be described.

Figure 13:
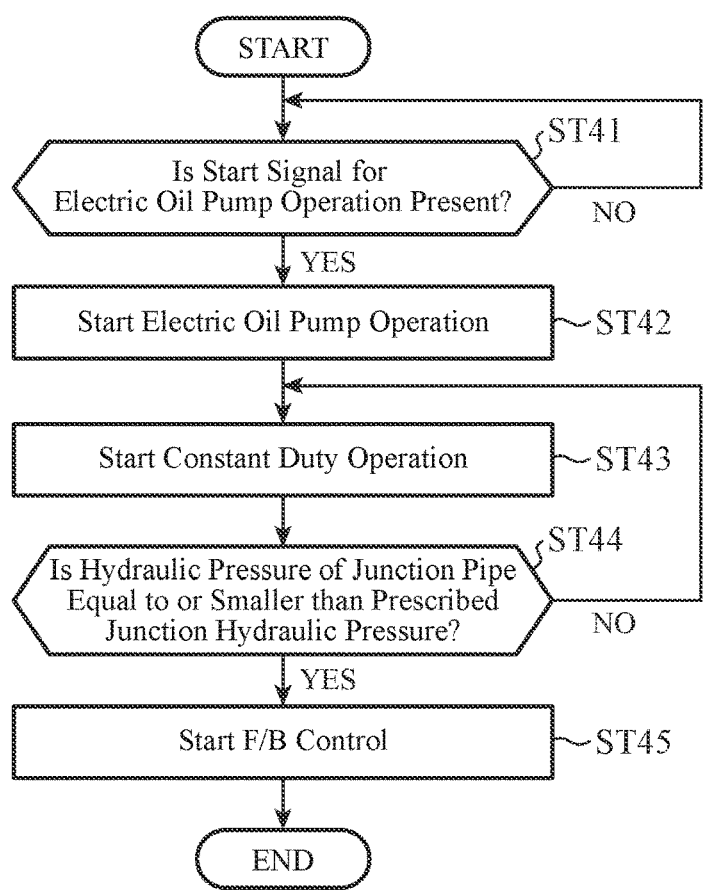
FIG. 13 is a flowchart showing an example of the operation performed by a control device for an electric motor according to Embodiment 4.
Figure 14:
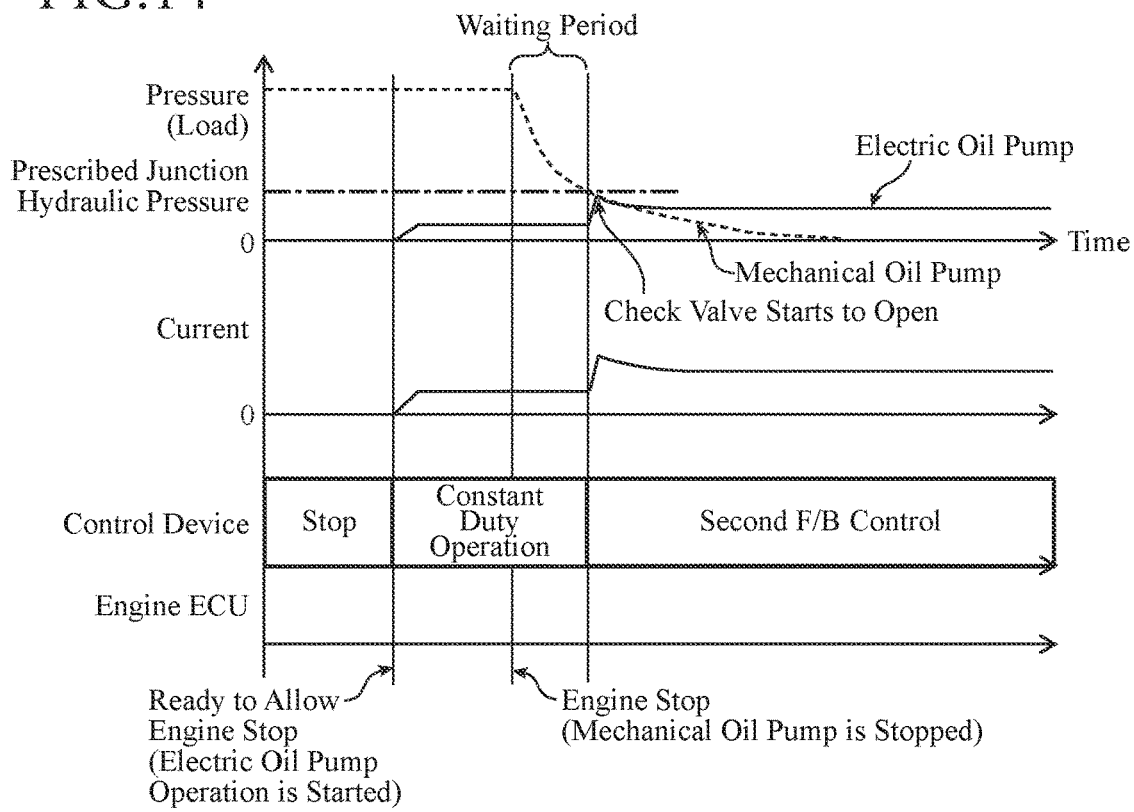
FIG. 14 is a timing chart showing an example of the operation of the hydraulic pressure supply system according to Embodiment 4.

FIG. 13 is a flowchart showing an example of the operation of the control device 42. FIG. 14 is a timing chart showing an example of the operation of the hydraulic pressure supply system, and shows the temporal changes of the hydraulic pressure of the outlet-side pipe of the mechanical oil pump 1, the hydraulic pressure of the outlet-side pipe of the electric oil pump 2, the power-supply current to the electric motor 3, the control state of the control device 42, and the control state of the engine ECU 41 in this order from the top of the paper sheet.

Similarly to Embodiment 1, when the engine ECU 41 determines that the engine stop condition is satisfied, the engine ECU 41 starts getting ready for the engine stop, and also outputs the start signal for an electric oil pump operation.

When the feedback controller 45 receives the start signal for an electric oil pump operation from the engine ECU 41 ("YES" in Step ST41), the feedback controller 45 starts supplying electric power to the electric motor 3 to thereby start the operation of the electric oil pump 2 (Step ST42). The feedback controller 45 starts the constant Duty operation first, generates the FET drive signal having the predetermined constant drive Duty ratio, and outputs the FET drive signal to the FET drive circuit 5 (Step ST43). On the other hand, when the feedback controller 45 does not receive the start signal for an electric oil pump operation from the engine ECU 41 ("NO" in Step ST41), the feedback controller 45 keeps the electric oil pump 2 stopped without starting supplying electric power to the electric motor 3.

Similarly to Embodiments 1 to 3, also in Embodiment 4, the mechanical oil pump 1 is in operation during the ready to allow the engine to be stopped, and hence the check valve 7 is subjected to the high hydraulic pressure and is closed, and the electric oil pump 2 cannot rotate. Accordingly, the electric motor 3 is brought into the locked state, and the target rotation speed cannot be reached even when a large current is passed. To cope with this, until the mechanical oil pump 1 is stopped and the hydraulic pressure of the junction pipe is reduced, the electric motor 3 is driven with the drive Duty ratio fixed to a specific value, and a small current is passed. With this, the electric oil pump 2 operates with the minimum power, and the prescribed outlet hydraulic pressure serving as the operation stop condition of the mechanical oil pump 1 is secured.

When the engine ECU 41 determines that the hydraulic pressure of the outlet-side pipe of the electric oil pump 2 measured by the hydraulic pressure measurement circuit 10 exceeds the prescribed outlet hydraulic pressure serving as the operation stop condition of the mechanical oil pump 1, the engine ECU 41 stops the engine.

In the case where the hydraulic pressure of the junction pipe measured by the hydraulic pressure measurement circuit 40 is equal to or smaller than the predetermined prescribed junction hydraulic pressure ("YES" in Step ST44), the Duty switching determination unit 44 outputs the command to cancel the constant Duty operation to the feedback controller 45. When the feedback controller 45 receives the command to cancel the constant Duty operation from the Duty switching determination unit 44, the feedback controller 45 switches from the constant Duty operation to the feedback control (Step ST45). On the other hand, when the feedback controller 45 does not receive the command to cancel the constant Duty operation from the Duty switching determination unit 44 ("NO" in Step ST44), the feedback controller 45 continues the constant Duty operation.

In Step ST45, the feedback controller 45 calculates the drive Duty ratio, generates the FET drive signal, and manipulates the power-supply voltage or the power-supply current to the electric motor 3, to cause the rotation speed of the electric motor 3 received from the position-information processor 43 to approach the target rotation speed received from the engine ECU 41.

The check valve 7 is still closed immediately after the start of the feedback control, and hence the electric oil pump 2 cannot easily rotate and the power-supply current to the electric motor 3 is temporarily increased. However, the mechanical oil pump 1 is already stopped and the check valve 7 starts to open immediately, and hence the power-supply current to the electric motor 3 is also reduced immediately. With this, in the present Embodiment 4, it is possible to further suppress the current supply to the electric motor 3 and further prevent the heat generation as compared with Embodiment 1 described above.

In view of the foregoing, according to Embodiment 4, the hydraulic pressure supply system is configured to include: the mechanical oil pump 1; the electric oil pump 2; the electric motor 3 that drives the electric oil pump 2; the control device 42 that controls the operation of the electric oil pump 2 by manipulating the power-supply voltage or the power-supply current to the electric motor 3; and the hydraulic pressure measurement circuit 40 that measures the hydraulic pressure of the junction pipe at which the outlet-side pipe of the mechanical oil pump 1 and the outlet-side pipe of the electric oil pump 2 meet each other. The control device 42 is configured to start supplying electric power to the electric motor 3 to thereby start the drive of the electric oil pump 2 before the mechanical oil pump 1 stops operating, and limit the power-supply current to the electric motor 3 to the first current or less during the time period between the start of the drive of the electric oil pump 2 and the time when the hydraulic pressure measured by the hydraulic pressure measurement circuit 40 is reduced to the prescribed junction hydraulic pressure or less. With this configuration, it is possible to suppress the useless current supply to the electric motor 3 during the time period in which the mechanical oil pump 1 and the electric oil pump 2 operate concurrently, and to prevent the heat generation.

In addition, according to Embodiment 4, the control device 42 includes: the position-information processor 43 configured to convert the rotation position information of the rotor of the electric motor 3 into the rotation speed; the Duty switching determination unit 44 configured to output the command to cancel the constant Duty operation in the case where the hydraulic pressure measured by the hydraulic pressure measurement circuit 40 is reduced to the prescribed junction hydraulic pressure or less; and the feedback controller 45 configured to calculate the drive Duty ratio and perform the feedback control to cause the rotation speed obtained by the conversion in the position-information processor 43 to approach the target rotation speed by manipulating the power-supply voltage or the power-supply current to the electric motor 3 by the PWM control. The feedback controller 45 fixes the drive Duty ratio to a value corresponding to the first current or less during the time period between the start of the drive of the electric oil pump 2 and the receipt of the command to cancel the constant Duty operation. Hence, it is possible to suppress the useless current supply to the electric motor 3 and to prevent the heat generation by the simple method without using the means for measuring or estimating the power-supply current to the electric motor 3.

Embodiment 5

Figure 15:
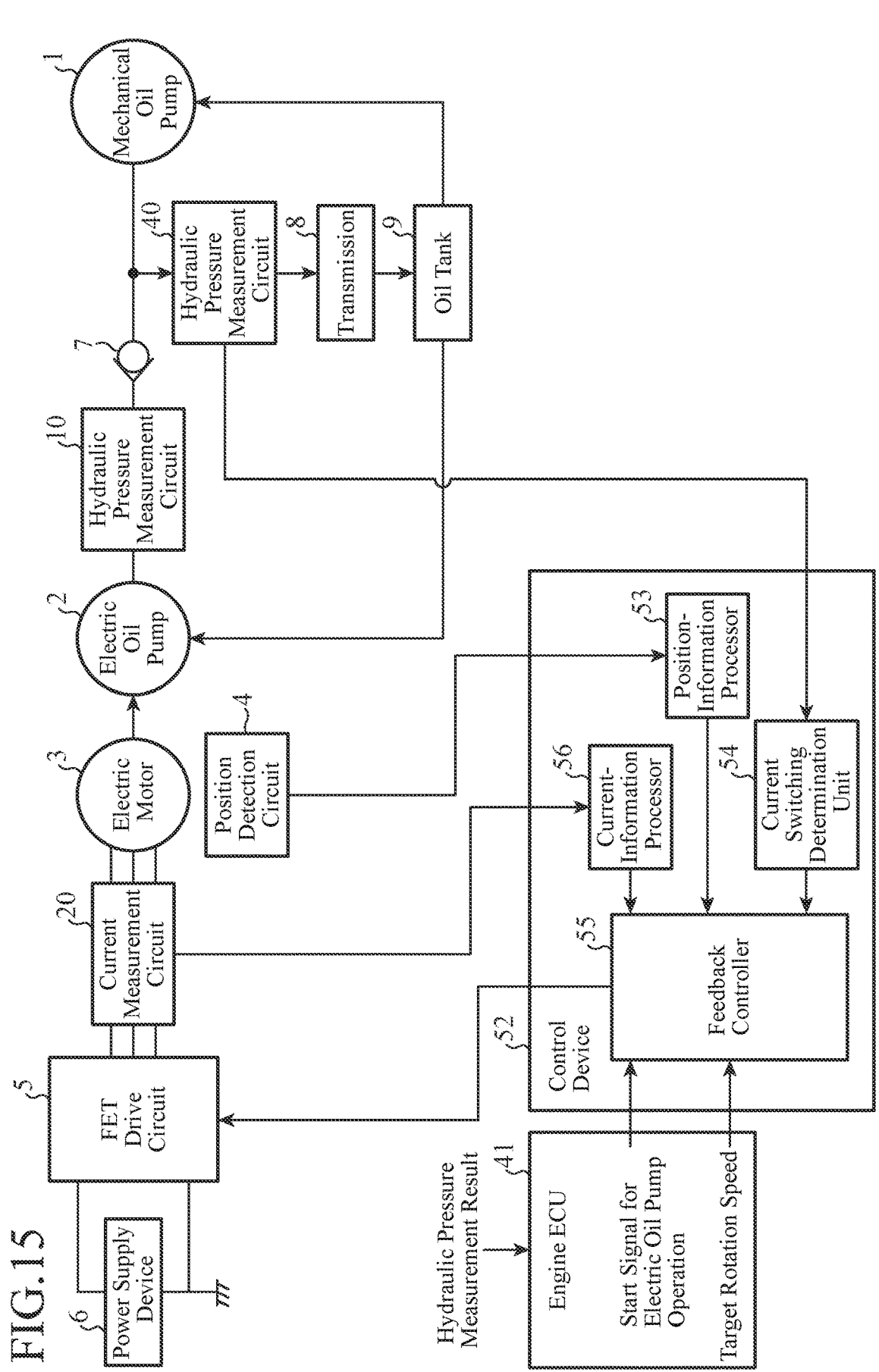
FIG. 15 is a block diagram showing an example of the configuration of a hydraulic pressure supply system according to Embodiment 5 of the invention.

FIG. 15 is a block diagram showing an example of the configuration of a hydraulic pressure supply system according to Embodiment 5 of the invention. The hydraulic pressure supply system according to Embodiment 5 has a configuration in which the current measurement circuit 20 and the hydraulic pressure measurement circuit 40 are added to the hydraulic pressure supply system of Embodiment 1 shown in FIG. 1. Similarly to Embodiment 2 described above, the current measurement circuit 20 measures the current passed through the electric motor 3 from the FET drive circuit 5, and outputs the measurement result to a control device 52. Similarly to Embodiment 4 described above, the hydraulic pressure measurement circuit 40 measures the hydraulic pressure of the junction pipe at which the outlet-side pipe of the mechanical oil pump 1 and the outlet-side pipe of the electric oil pump 2 meet each other, and outputs the measurement result to the control device 52.

The check valve 7 may or may not be provided.

In Embodiment 5, the control device 52 that controls the electric motor 3 includes a position-information processor 53, a current switching determination unit 54, a feedback controller 55, and a current-information processor 56. The individual functions of the position-information processor 53, the current switching determination unit 54, the feedback controller 55, and the current-information processor 56 in the control device 52 are implemented by the processor circuit 100 shown in FIG. 5A or the processor 101 shown in FIG. 5B.

The current-information processor 56 receives the power-supply current of each phase from the current measurement circuit 20, calculates the power-supply current of the electric motor 3, and outputs the power-supply current to the feedback controller 55.

Note that, similarly to Embodiment 2 described above, the current measurement circuit 20 may measure the current of one phase, and the current-information processor 56 may estimate the currents of the remaining two phases based on the current of the one phase. Alternatively, the current measurement circuit 20 may measure the currents of two phases, and the current-information processor 56 may estimate the current of the remaining one phase based on the currents of the two phases.

Further, the currents may be estimated based on the drive Duty ratio, the voltage of the electric motor 3, and the like in the current-information processor 56 without using the current measurement circuit 20.

The position-information processor 53 receives the rotation position information of the rotor detected by the position detection circuit 4, converts the rotation position information into the rotation speed, and outputs the rotation position and the rotation speed to the feedback controller 55.

The current switching determination unit 54 receives the measurement result of the hydraulic pressure in the junction pipe of the mechanical oil pump 1 and the electric oil pump 2 from the hydraulic pressure measurement circuit 40. In the case where the hydraulic pressure of the junction pipe is equal to or smaller than the predetermined prescribed junction hydraulic pressure, the current switching determination unit 54 outputs the command to switch the current upper limit value to the feedback controller 55.

The prescribed junction hydraulic pressure is as described in Embodiment 4 described above.

The feedback controller 55 receives the current rotation position and rotation speed of the rotor of the electric motor 3 from the position-information processor 53, the command to switch the current upper limit value from the current switching determination unit 54, the power-supply current of the electric motor 3 from the current-information processor 56, and the target rotation speed of the electric motor 3 and the start signal for an electric oil pump operation from the engine ECU 41.

Similarly to the feedback controller 25 of Embodiment 2 described above, when the feedback controller 55 receives the start signal for an electric oil pump operation from the engine ECU 41, the feedback controller 55 starts operating, sets the predetermined first current as the current upper limit value first, and starts the first feedback control.

When the feedback controller 55 receives the command to switch the current upper limit value from the current switching determination unit 54 during the first feedback control, the feedback controller 55 sets the predetermined second current as the current upper limit value, and starts the second feedback control.

The first current and the second current are as described in Embodiment 2 described above.

Next, with reference to FIG. 16 and FIG. 17, the operation of the control device 52 will be described.

Figure 16:
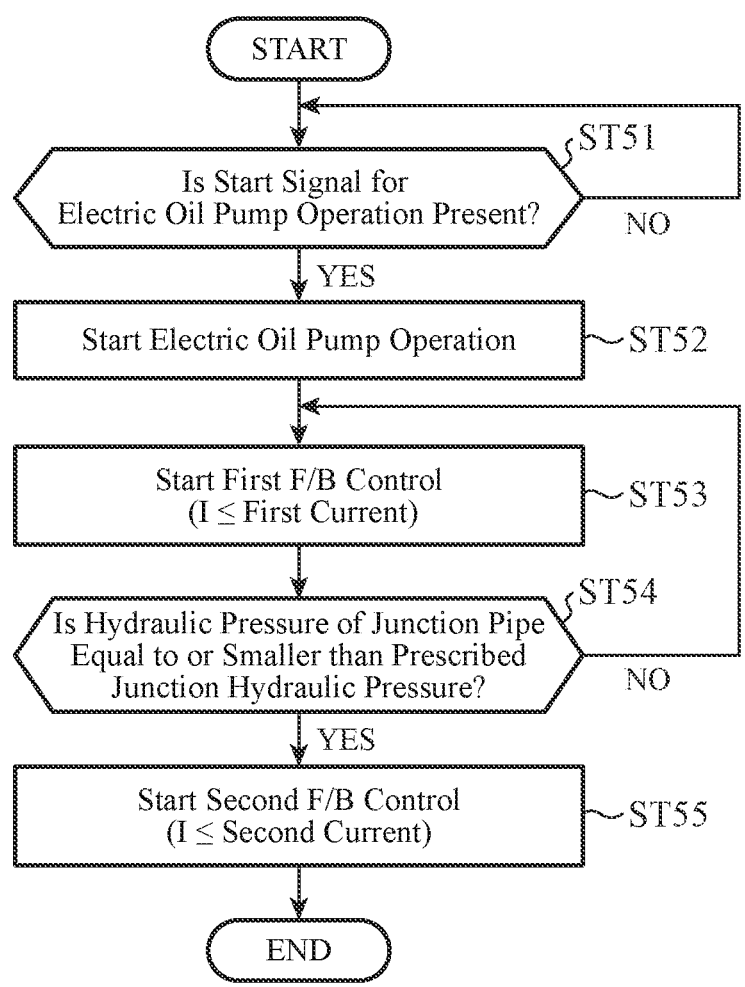
FIG. 16 is a flowchart showing an example of the operation performed by a control device for an electric motor according to Embodiment 5.
Figure 17:
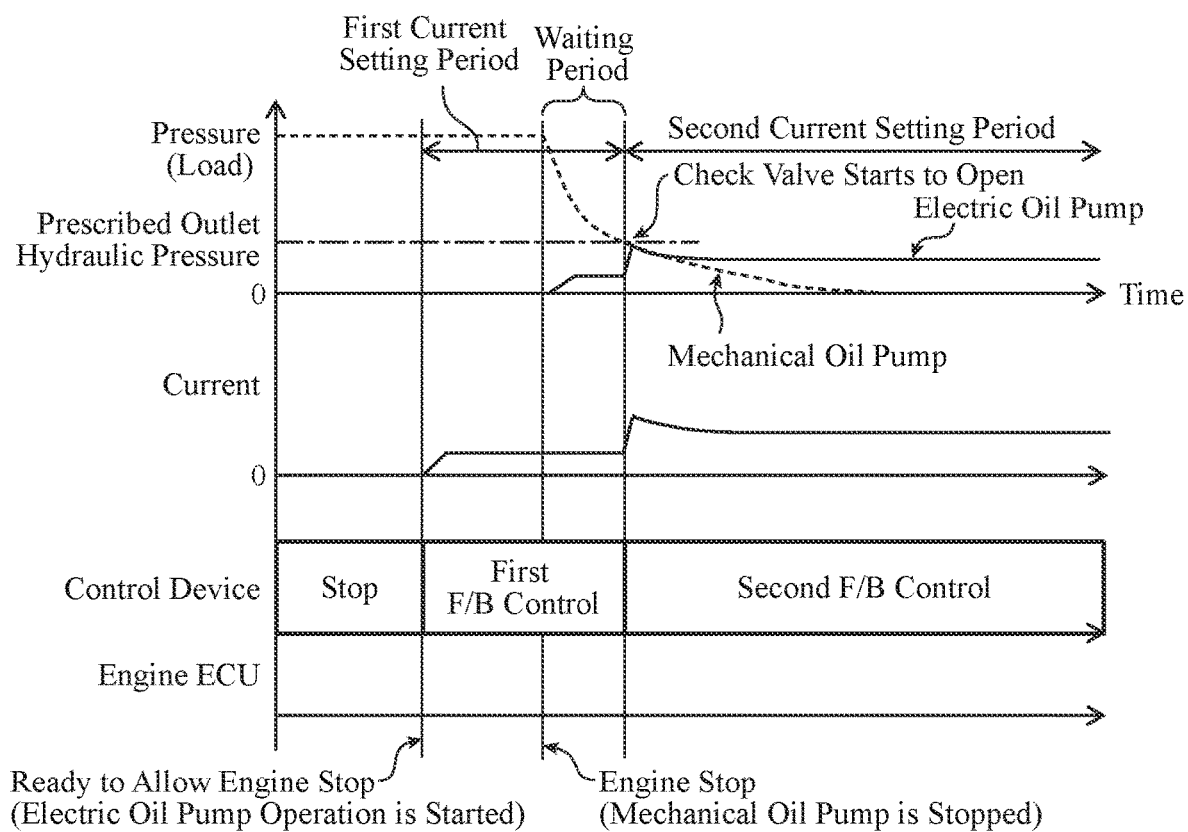
FIG. 17 is a timing chart showing an example of the operation of the hydraulic pressure supply system according to Embodiment 5.

FIG. 16 is a flowchart showing an example of the operation of the control device 52. FIG. 17 is a timing chart showing an example of the operation of the hydraulic pressure supply system, and shows the temporal changes of the hydraulic pressure of the outlet-side pipe of the mechanical oil pump 1, the hydraulic pressure of the outlet-side pipe of the electric oil pump 2, the power-supply current to the electric motor 3, the control state of the control device 52, and the control state of the engine ECU 41 in this order from the top of the paper sheet.

Similarly to Embodiment 1, when the engine ECU 41 determines that the engine stop condition is satisfied, the engine ECU 41 starts getting ready for the engine stop, and also outputs the start signal for an electric oil pump operation.

When the feedback controller 55 receives the start signal for an electric oil pump operation from the engine ECU 41 ("YES" in Step ST51), the feedback controller 55 starts supplying electric power to the electric motor 3 to thereby start the operation of the electric oil pump 2 (Step ST52). The feedback controller 55 starts the first feedback control first, and sets the predetermined first current as the current upper limit value (Step ST53). On the other hand, when the feedback controller 55 does not receive the start signal for an electric oil pump operation from the engine ECU 41 ("NO" in Step ST51), the feedback controller 55 keeps the electric oil pump 2 stopped without starting supplying electric power to the electric motor 3.

Similarly to Embodiments 1 to 4, also in Embodiment 5, the mechanical oil pump 1 is in operation during the ready to allow the engine to be stopped, and hence the check valve 7 is subjected to the high hydraulic pressure and is closed, and the electric oil pump 2 cannot rotate. Accordingly, the electric motor 3 is brought into the locked state, and the target rotation speed cannot be reached. To cope with this, until the mechanical oil pump 1 is stopped and the hydraulic pressure of the junction pipe is reduced, the power-supply current to the electric motor 3 is limited to the first current or less and the electric oil pump 2 is operated. With this, the prescribed outlet hydraulic pressure serving as the operation stop condition of the mechanical oil pump 1 is secured with the minimum power.

When the engine ECU 41 determines that the hydraulic pressure of the outlet-side pipe of the electric oil pump 2 measured by the hydraulic pressure measurement circuit 10 exceeds the prescribed outlet hydraulic pressure serving as the operation stop condition of the mechanical oil pump 1, the engine ECU 41 stops the engine.

In the case where the hydraulic pressure of the junction pipe measured by the hydraulic pressure measurement circuit 40 is equal to or smaller than the predetermined prescribed junction hydraulic pressure ("YES" in Step ST54), the current switching determination unit 54 outputs the command to switch the current upper limit value to the feedback controller 55. When the feedback controller 55 receives the command to switch the current upper limit value from the current switching determination unit 54, the feedback controller 55 switches the current upper limit value from the first current to the second current, and performs the second feedback control (Step ST55). On the other hand, when the feedback controller 55 does not receive the command to switch the current upper limit value from the current switching determination unit 54 ("NO" in Step ST54), the feedback controller 55 continues the first feedback control.

The check valve 7 is still closed immediately after the start of the second feedback control, and hence the electric oil pump 2 cannot easily rotate and the power-supply current to the electric motor 3 is temporarily increased. However, the mechanical oil pump 1 is already stopped and check valve 7 starts to open immediately, and hence the power-supply current to the electric motor 3 is also reduced immediately. With this, in the present Embodiment 5, it is possible to further suppress the current supply to the electric motor 3 and further prevent the heat generation as compared with Embodiment 2 described above.

In view of the foregoing, according to Embodiment 5, the control device 52 includes: the current-information processor 56 configured to measure or estimate the power-supply current to the electric motor 3; the position-information processor 53 configured to convert the rotation position information of the rotor of the electric motor 3 into the rotation speed; the current switching determination unit 54 configured to output the command to switch the current upper limit value in the case where the hydraulic pressure measured by the hydraulic pressure measurement circuit 40 is reduced to the prescribed junction hydraulic pressure or less; and the feedback controller 55 configured to perform the feedback control to cause the rotation speed obtained by the conversion in the position-information processor 53 to approach the target rotation speed by manipulating the power-supply voltage or the power-supply current to the electric motor 3. The feedback controller 55 limits the power-supply current to the electric motor 3 to the first current or less during the time period between the start of the drive of the electric oil pump 2 and the receipt of the command to switch the current upper limit value, and, after the receipt of the command to switch the current upper limit value, limits the power-supply current to the electric motor 3 to the second current or less where the second current is larger than the first current. Hence, it is possible to suppress the useless current supply to the electric motor 3 and prevent the heat generation.

Embodiment 6

Figure 18:
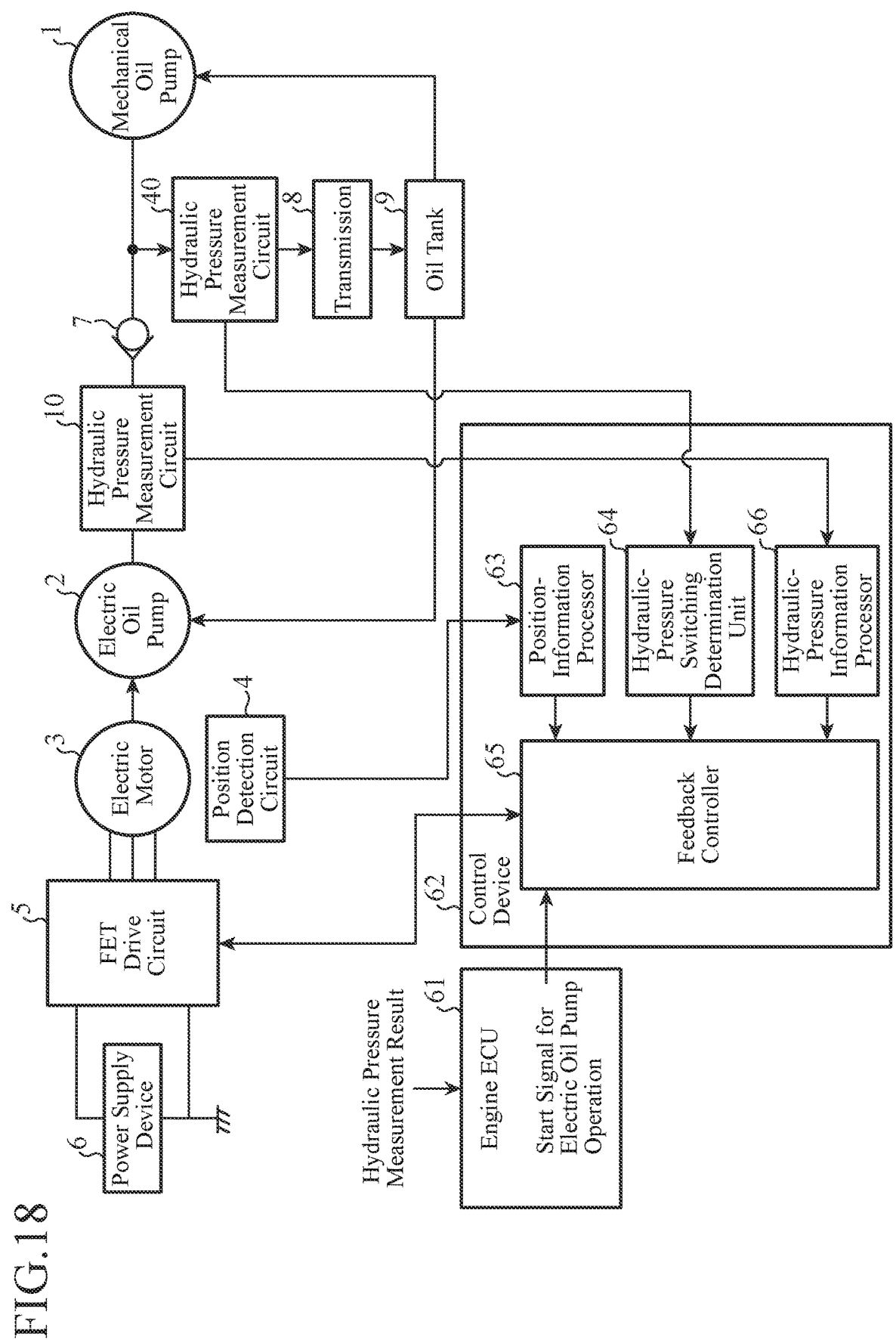
FIG. 18 is a block diagram showing an example of the configuration of a hydraulic pressure supply system according to Embodiment 6 of the invention.

FIG. 18 is a block diagram showing an example of the configuration of a hydraulic pressure supply system according to Embodiment 6 of the invention. The hydraulic pressure supply system according to Embodiment 6 has a configuration in which the hydraulic pressure measurement circuit 40 is added to the hydraulic pressure supply system of Embodiment 1 shown in FIG. 1. Similarly to Embodiment 4 described above, the hydraulic pressure measurement circuit 40 measures the hydraulic pressure of the junction pipe at which the outlet-side pipe of the mechanical oil pump 1 and the outlet-side pipe of the electric oil pump 2 meet each other, and outputs the measurement result to a control device 62.

The hydraulic pressure measurement circuit 10 is a second hydraulic pressure measurement circuit, and measures the hydraulic pressure of the outlet-side pipe of the electric oil pump 2 as the second pump at an upstream position relative to the check valve 7.

In Embodiment 6, the control device 62 that controls the electric motor 3 includes a position-information processor 63, a hydraulic-pressure switching determination unit 64, a feedback controller 65, and a hydraulic-pressure information processor 66. The individual functions of the position-information processor 63, the hydraulic-pressure switching determination unit 64, the feedback controller 65, and the hydraulic-pressure information processor 66 in the control device 62 are implemented by the processor circuit 100 shown in FIG. 5A or the processor 101 shown in FIG. 5B.

The position-information processor 63 receives the rotation position information of the rotor detected by the position detection circuit 4, and outputs the rotation position information to the feedback controller 65.

The hydraulic-pressure switching determination unit 64 receives the measurement result of the hydraulic pressure in the junction pipe of the mechanical oil pump 1 and the electric oil pump 2 from the hydraulic pressure measurement circuit 40. In the case where the hydraulic pressure of the junction pipe is equal to or smaller than the predetermined prescribed junction hydraulic pressure, the hydraulic-pressure switching determination unit 64 outputs the command to switch the target hydraulic pressure to the feedback controller 65. The prescribed junction hydraulic pressure is as described in Embodiment 4 described above.

The hydraulic-pressure information processor 66 receives the measurement result of the hydraulic pressure of the outlet-side pipe of the electric oil pump 2 from the hydraulic pressure measurement circuit 10, and outputs the measurement result thereof to the feedback controller 65.

The feedback controller 65 receives the current rotation position of the rotor of the electric motor 3 from the position-information processor 63, the command to switch the target hydraulic pressure from the hydraulic-pressure switching determination unit 64, the current hydraulic pressure of the outlet-side pipe of the electric oil pump 2 from the hydraulic-pressure information processor 66, and the start signal for an electric oil pump operation from the engine ECU 61.

Similarly to the feedback controller 35 of Embodiment 3 described above, when the feedback controller 65 receives the start signal for an electric oil pump operation from the engine ECU 61, the feedback controller 65 starts operating, sets the predetermined first hydraulic pressure as the target hydraulic pressure first, and starts the first feedback control.

When the feedback controller 65 receives the command to switch the target hydraulic pressure from the hydraulic-pressure switching determination unit 64 during the first feedback control, the feedback controller 65 sets the predetermined second hydraulic pressure as the target hydraulic pressure, and starts the second feedback control.

The first hydraulic pressure and the second hydraulic pressure are as described in Embodiment 3 described above.

Next, with reference to FIG. 19 and FIG. 20, the operation of the control device 62 will be described.

Figure 19:
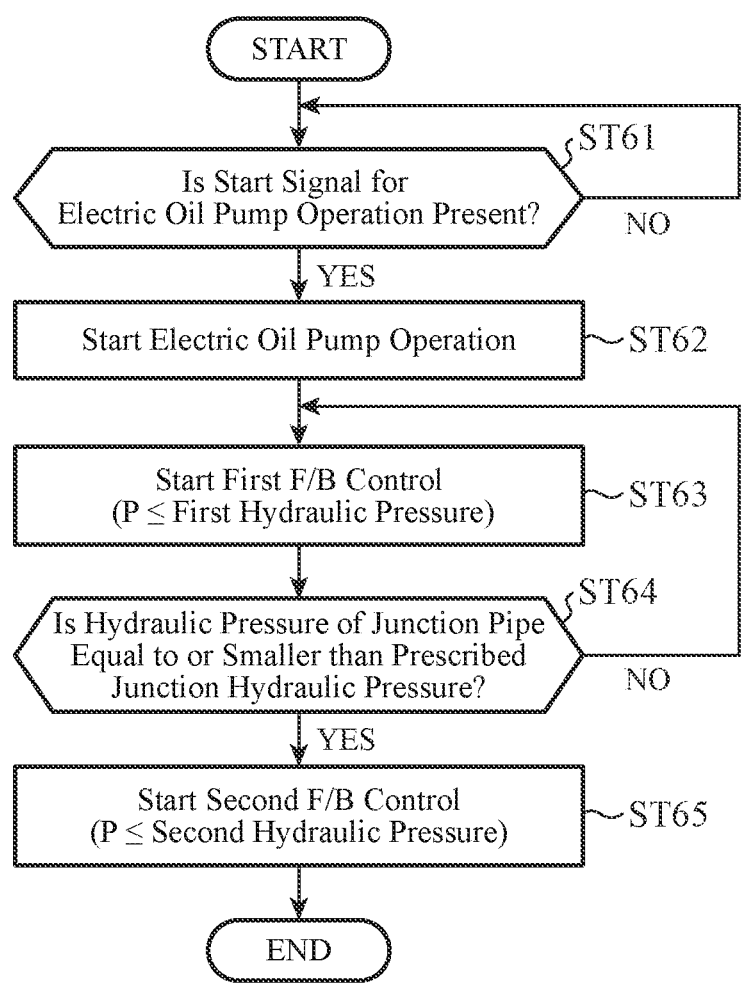
FIG. 19 is a flowchart showing an example of the operation performed by a control device for an electric motor according to Embodiment 6.
Figure 20:
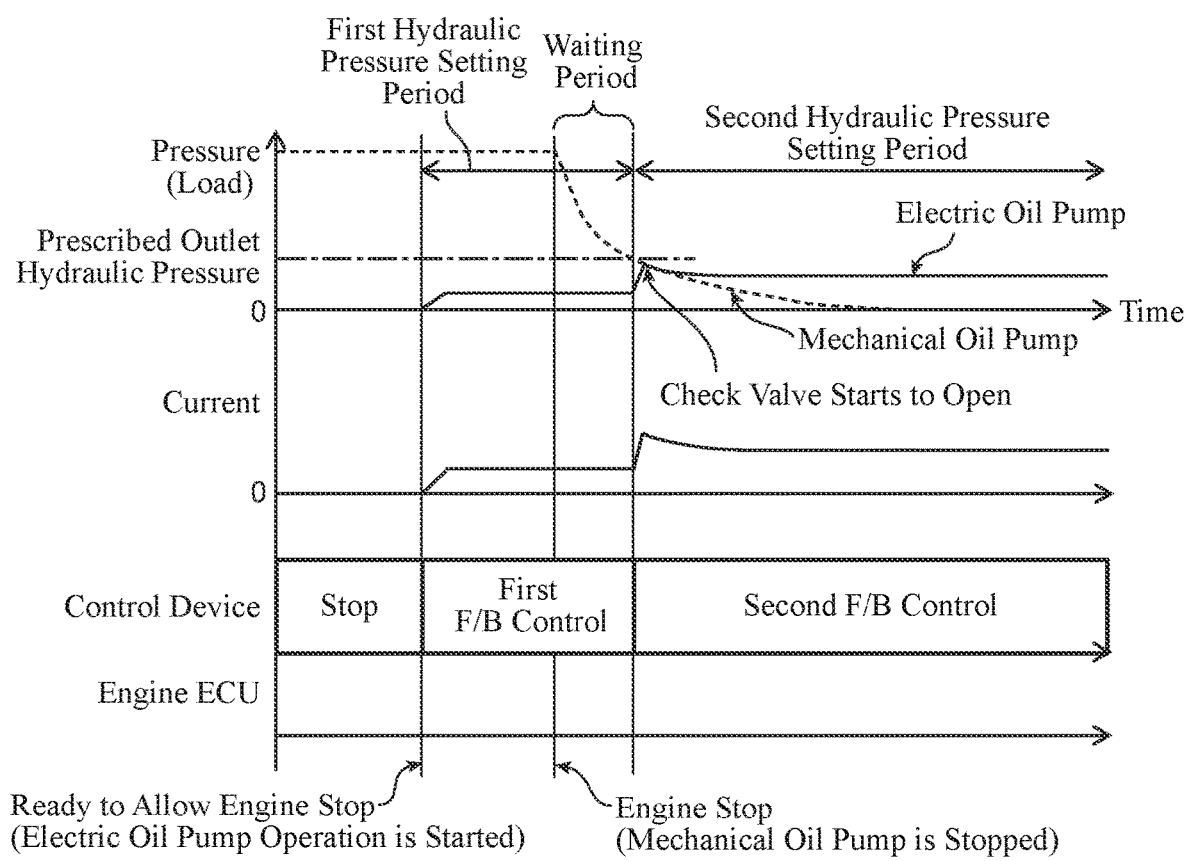
FIG. 20 is a timing chart showing an example of the operation of the hydraulic pressure supply system according to Embodiment 6.

FIG. 19 is a flowchart showing an example of the operation of the control device 62. FIG. 20 is a timing chart showing an example of the operation of the hydraulic pressure supply system, and shows the temporal changes of the hydraulic pressure of the outlet-side pipe of the mechanical oil pump 1, the hydraulic pressure of the outlet-side pipe of the electric oil pump 2, the power-supply current to the electric motor 3, the control state of the control device 62, and the control state of the engine ECU 61 in this order from the top of the paper sheet.

Similarly to Embodiment 1, when the engine ECU 61 determines that the engine stop condition is satisfied, the engine ECU 61 starts the preparation for the stop of the engine, and also outputs the start signal for an electric oil pump operation.

When the feedback controller 65 receives the start signal for an electric oil pump operation from the engine ECU 61 ("YES" in Step ST61), the feedback controller 65 starts supplying electric power to the electric motor 3 to thereby start the operation of the electric oil pump 2 (Step ST62). The feedback controller 65 starts the first feedback control first, and sets the predetermined first hydraulic pressure as the target hydraulic pressure. Subsequently, the feedback controller 65 calculates the drive Duty ratio from the deviation between the current hydraulic pressure P of the outlet-side pipe of the electric oil pump 2 received from the hydraulic-pressure information processor 66 and the first hydraulic pressure, generates the FET drive signal corresponding to the drive Duty ratio, and outputs the FET drive signal to the FET drive circuit 5 (Step ST63). On the other hand, when the feedback controller 65 does not receive the start signal for an electric oil pump operation from the engine ECU 61 ("NO" in Step ST61), the feedback controller 65 keeps the electric oil pump 2 stopped without starting supplying electric power to the electric motor 3.

Similarly to Embodiments 1 to 5, also in Embodiment 6, the mechanical oil pump 1 is in operation during the preparation for the stop of the engine, and hence the check valve 7 is subjected to the high hydraulic pressure and is closed, and the electric oil pump 2 cannot rotate. Accordingly, the electric motor 3 is brought into the locked state, and the normal hydraulic pressure required by the transmission 8 during the engine stop cannot be supplied. To cope with this, until the mechanical oil pump 1 is stopped and the hydraulic pressure of the junction pipe is reduced, the electric oil pump 2 is operated to cause the hydraulic pressure of the outlet-side pipe of the electric oil pump 2 to approach the first hydraulic pressure. With this, the prescribed outlet hydraulic pressure serving as the operation stop condition of the mechanical oil pump 1 is secured with the minimum power.

When the engine ECU 61 determines that the hydraulic pressure of the outlet-side pipe of the electric oil pump 2 measured by the hydraulic pressure measurement circuit 10 exceeds the prescribed outlet hydraulic pressure serving as the operation stop condition of the mechanical oil pump 1, the engine ECU 61 stops the engine.

In the case where the hydraulic pressure of the junction pipe measured by the hydraulic pressure measurement circuit 40 is equal to or smaller than the predetermined prescribed junction hydraulic pressure ("YES" in Step ST64), the hydraulic-pressure switching determination unit 64 outputs the command to switch the target hydraulic pressure to the feedback controller 65. When the feedback controller 65 receives the command to switch the target hydraulic pressure from the hydraulic-pressure switching determination unit 64, the feedback controller 65 switches the target hydraulic pressure from the first hydraulic pressure to the second hydraulic pressure, and performs the second feedback control (Step ST65). The feedback controller 65 calculates the drive Duty ratio from the deviation between the current hydraulic pressure P of the outlet-side pipe of the electric oil pump 2 received from the hydraulic-pressure information processor 66 and the second hydraulic pressure, generates the FET drive signal corresponding to the drive Duty ratio, and outputs the FET drive signal to the FET drive circuit 5. On the other hand, when the feedback controller 65 does not receive the command to switch the target hydraulic pressure from the hydraulic-pressure switching determination unit 64 ("NO" in Step ST64), the feedback controller 65 continues the first feedback control.

The check valve 7 is still closed immediately after the start of the second feedback control, and hence the electric oil pump 2 cannot easily rotate, and the power-supply current to the electric motor 3 is temporarily increased. However, the hydraulic pressure in the outlet-side pipe of the mechanical oil pump 1 is reduced and the check valve 7 is opened immediately, and hence the power-supply current to the electric motor 3 is also reduced. With this, in the present Embodiment 6, it is possible to further suppress the current supply to the electric motor 3 and further prevent the heat generation as compared with Embodiment 3 described above.

In view of the foregoing, according to Embodiment 6, the hydraulic pressure supply system is configured to include: the mechanical oil pump 1; the electric oil pump 2; the electric motor 3 that drives the electric oil pump 2; the check valve 7 that is installed at an upstream position relative to the junction pipe at which the outlet-side pipe of the mechanical oil pump 1 and the outlet-side pipe of the electric oil pump 2 meet each other and that prevents the backflow from the mechanical oil pump 1 to the electric oil pump 2; the hydraulic pressure measurement circuit 40 that measures the hydraulic pressure of the junction pipe; and the hydraulic pressure measurement circuit 10 that measures the hydraulic pressure of the outlet-side pipe of the electric oil pump 2 at an upstream position relative to the check valve 7. The control device 62 includes: the hydraulic-pressure switching determination unit 64 configured to output the command to switch the target hydraulic pressure in the case where the hydraulic pressure measured by the hydraulic pressure measurement circuit 40 is reduced to the prescribed junction hydraulic pressure or less; and the feedback controller 65 configured to perform the feedback control to cause the hydraulic pressure measured by the hydraulic pressure measurement circuit 10 to approach the target hydraulic pressure by manipulating the power-supply voltage or the power-supply current to the electric motor 3. The feedback controller 65 sets the target hydraulic pressure to the first hydraulic pressure that is equal to or larger than the minimum value of the hydraulic pressure required by the transmission 8 during the time period between the start of the drive of the electric oil pump 2 and the receipt of the command to switch the target hydraulic pressure, and sets the target hydraulic pressure to the second hydraulic pressure that is larger than the first hydraulic pressure after the receipt of the command to switch the target hydraulic pressure. Hence, it is possible to suppress the useless current supply by suppressing the useless rotation of the electric motor 3 at the hydraulic pressure higher than the target hydraulic pressure, and to prevent the heat generation.

Note that, in the case where the check valve 7 is not installed in the example of the configuration in FIG. 18, the hydraulic pressure of the outlet-side pipe of the electric oil pump 2 is equal to the hydraulic pressure of the junction pipe, and hence either one of the hydraulic pressure measurement circuit 10 and the hydraulic pressure measurement circuit 40 can be installed. In addition, in the control device 62, the hydraulic-pressure switching determination unit 64 determines the switching of the target hydraulic pressure on the basis of the hydraulic pressure measured by one of the hydraulic pressure measurement circuit 10 and the hydraulic pressure measurement circuit 40, and the feedback controller 65 performs the first feedback control and the second feedback control on the basis of the hydraulic pressure measured by one of the hydraulic pressure measurement circuit 10 and the hydraulic pressure measurement circuit 40.

Note that, in the present invention, it is possible to freely combine the embodiments, modify any components in the embodiments, or omit any components in the embodiments within the scope of the invention.

INDUSTRIAL APPLICABILITY

Since the hydraulic pressure supply system according to the invention is configured to suppress the useless current supply to an electric motor during the time period in which a mechanical oil pump and an electric oil pump operate concurrently, thereby preventing heat generation, the hydraulic pressure supply system is preferably used as a hydraulic pressure supply system that supplies a hydraulic pressure to a transmission of an automatic engine-stop vehicle.

REFERENCE SIGNS LIST

1: mechanical oil pump (first pump); 2: electric oil pump (second pump); 3: electric motor; 4: position detection circuit; 5: FET drive circuit; 6: power supply device; 7: check valve; 8: transmission (hydraulic-pressure receiving equipment); 9: oil tank; 10: hydraulic pressure measurement circuit (second hydraulic pressure measurement circuit); 11, 31, 41, 61: engine ECU; 12, 22, 32, 42, 52, 62: control device; 13, 23, 33, 43, 53, 63: position-information processor; 14, 44: Duty switching determination unit; 15, 25, 35, 45, 55, 65: feedback controller; 20: current measurement circuit; 24, 54: current switching determination unit; 26, 56: current-information processor; 34, 64: hydraulic-pressure switching determination unit; 36, 66: hydraulic-pressure information processor; 40: hydraulic pressure measurement circuit; 100: processor circuit; 101: processor; and 102: memory.

The invention claimed is:

1. A control device for an electric motor for use in a hydraulic pressure supply system which comprises: a first pump; a second pump; the electric motor that drives the second pump; a check valve being installed at an upstream position relative to a junction pipe at which an outlet-side pipe of the first pump and an outlet-side pipe of the second pump meet each other, and preventing backflow from the first pump to the second pump; and a hydraulic pressure measurement circuit that measures a hydraulic pressure of the outlet-side pipe of the second pump at an upstream position relative to the check valve, the hydraulic pressure supply system supplying a hydraulic pressure to hydraulic-pressure receiving equipment from the junction pipe, the control device including a processor circuit configured to:

control an operation of the second pump by manipulating a power-supply voltage or a power-supply current to the electric motor;

start supplying electric power to the electric motor to thereby start drive of the second pump before the first pump stops operating; and limit the power-supply current to the electric motor to a predetermined first current or less during a time period between the start of the drive of the second pump and a time when the hydraulic pressure measured by the hydraulic pressure measurement circuit exceeds a prescribed outlet hydraulic pressure serving as an operation stop condition of the first pump.

2. The control device for the electric motor according to claim 1, wherein the processor circuit is further configured to function as:

a position-information processor circuit that converts rotation position information of a rotor of the electric motor into a rotation speed;

a Duty switching determination unit that outputs a command to cancel a constant Duty operation in a case where the hydraulic pressure measured by the hydraulic pressure measurement circuit exceeds the prescribed outlet hydraulic pressure; and a feedback controller that calculates a Duty ratio and performs feedback control to cause the rotation speed obtained by the conversion in the position-information processor circuit to approach a target rotation speed by manipulating the power-supply voltage or the power-supply current to the electric motor by pulse width modulation control, wherein the feedback controller fixes the Duty ratio to a value corresponding to the first current or less during a time period between the start of the drive of the second pump and receipt of the command to cancel the constant Duty operation.

3. The control device for the electric motor according to claim 1, wherein the processor circuit is further configured to function as:

a current-information processor circuit that measures or estimates the power-supply current to the electric motor;

a position-information processor circuit that converts rotation position information of a rotor of the electric motor into a rotation speed;

a current switching determination unit that outputs a command to switch a current upper limit value in a case where the hydraulic pressure measured by the hydraulic pressure measurement circuit exceeds the prescribed outlet hydraulic pressure; and a feedback controller that performs feedback control to cause the rotation speed obtained by the conversion in the position-information processor circuit to approach a target rotation speed by manipulating the power-supply voltage or the power-supply current to the electric motor, wherein the feedback controller limits the power-supply current to the electric motor to the first current or less during a time period between the start of the drive of the second pump and receipt of the command to switch the current upper limit value, and, after the receipt of the command to switch the current upper limit value, limits the power-supply current to the electric motor to a predetermined second current or less, the predetermined second current being larger than the first current.

4. The control device for the electric motor according to claim 1, wherein the processor circuit is further configured to function as:

a hydraulic-pressure switching determination unit that outputs a command to switch a target hydraulic pressure in a case where the hydraulic pressure measured by the hydraulic pressure measurement circuit exceeds the prescribed outlet hydraulic pressure; and a feedback controller that performs feedback control to cause the hydraulic pressure measured by the hydraulic pressure measurement circuit to approach the target hydraulic pressure by manipulating the power-supply voltage or the power-supply current to the electric motor, wherein the feedback controller sets the target hydraulic pressure to a first hydraulic pressure that is equal to or larger than a minimum value of a hydraulic pressure required by the hydraulic-pressure receiving equipment and is equal to or larger than the prescribed outlet hydraulic pressure during a time period between the start of the drive of the second pump and receipt of the command to switch the target hydraulic pressure, and, after the receipt of the command to switch the target hydraulic pressure, sets the target hydraulic pressure to a predetermined second hydraulic pressure that is larger than the first hydraulic pressure.

5. A hydraulic pressure supply system comprising:

a first pump;

a second pump;

an electric motor that drives the second pump;

a control device including a processor circuit configured to control an operation of the second pump by manipulating a power-supply voltage or a power-supply current to the electric motor;

a check valve being installed at an upstream position relative to a junction pipe at which an outlet-side pipe of the first pump and an outlet-side pipe of the second pump meet each other, and preventing backflow from the first pump to the second pump; and a hydraulic pressure measurement circuit configured to measure a hydraulic pressure of the outlet-side pipe of the second pump at an upstream position relative to the check valve, the hydraulic pressure supply system supplying a hydraulic pressure to hydraulic-pressure receiving equipment from the junction pipe, wherein the processor circuit is configured to:

start supplying electric power to the electric motor to thereby start drive of the second pump before the first pump stops operating; and limit the power-supply current to the electric motor to a predetermined first current or less during a time period between the start of the drive of the second pump and a time when the hydraulic pressure measured by the hydraulic pressure measurement circuit exceeds a prescribed outlet hydraulic pressure serving as an operation stop condition of the first pump.

\* \* \* \* \*